US012657143B2

(12) United States Patent　　　　(10) Patent No.:　US 12,657,143 B2
Deidda　　　　　　　　　　　　　　(45) Date of Patent:　Jun. 16, 2026

(54) DIRECT MEMORY ACCESS (DMA) ENGINE PROCESSING DATA TRANSFER TASKS IN PARALLEL

(71) Applicant: Intel Corporation, Santa Clara, CA (US)

(72) Inventor: Andrea Deidda, Celbridge (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/942,545

(22) Filed: Sep. 12, 2022

(65) Prior Publication Data

US 2023/0259467 A1　　Aug. 17, 2023

(51) Int. Cl.
G06F 13/28　　　　(2006.01)
G06F 3/06　　　　(2006.01)

(52) U.S. Cl.
CPC ............ G06F 13/28 (2013.01); G06F 3/0611 (2013.01); G06F 3/0659 (2013.01); G06F 3/0673 (2013.01); G06F 2213/28 (2013.01)

(58) Field of Classification Search
CPC .... G06F 3/0611; G06F 3/0659; G06F 3/0673; G06F 13/28; G06F 2213/28
See application file for complete search history.

(56) References Cited

U.S. PATENT DOCUMENTS

| 11,875,247 B1 * | 1/2024 | Heaton | ................. | G06N 3/063 |
| 2018/0089128 A1 * | 3/2018 | Nicol | ................. | G06F 13/4221 |
| 2019/0286974 A1 * | 9/2019 | Li | ................. | G06N 3/045 |
| 2022/0350598 A1 * | 11/2022 | Guan | ................. | G06F 7/5443 |

* cited by examiner

*Primary Examiner* — Eric T Oberly
(74) *Attorney, Agent, or Firm* — Akona IP PC

(57)　　　　ABSTRACT

An DNN accelerator includes a DMA engine that can execute tasks in parallel. A task includes a sequence of stages, such as a sequence including a source stage, response stage, destination stage, and post stage. The DMA engine may include a channel having a pipelined structure that includes a sequence of control modules and a sequence of data processing modules. A control module may correspond to a data processing module. A pair of control module and data processing module may constitute a stage of the channel, which processes a corresponding stage of tasks. The channel may execute multiple tasks in parallel. For instance, the second stage of a first task may be processed simultaneously with the first stage of a second task. The parallel execution of multiple tasks can reduce or remove impact of memory latencies on performance of the DNN accelerator.

22 Claims, 14 Drawing Sheets

DNN
100

Object 115

Object 125

Object 135

Input Image 105

140　183　150　163　160

180　190　193

Convolutional Layer 110

Pooling Layer 120

Fully Connected Layer 130

FIG. 7

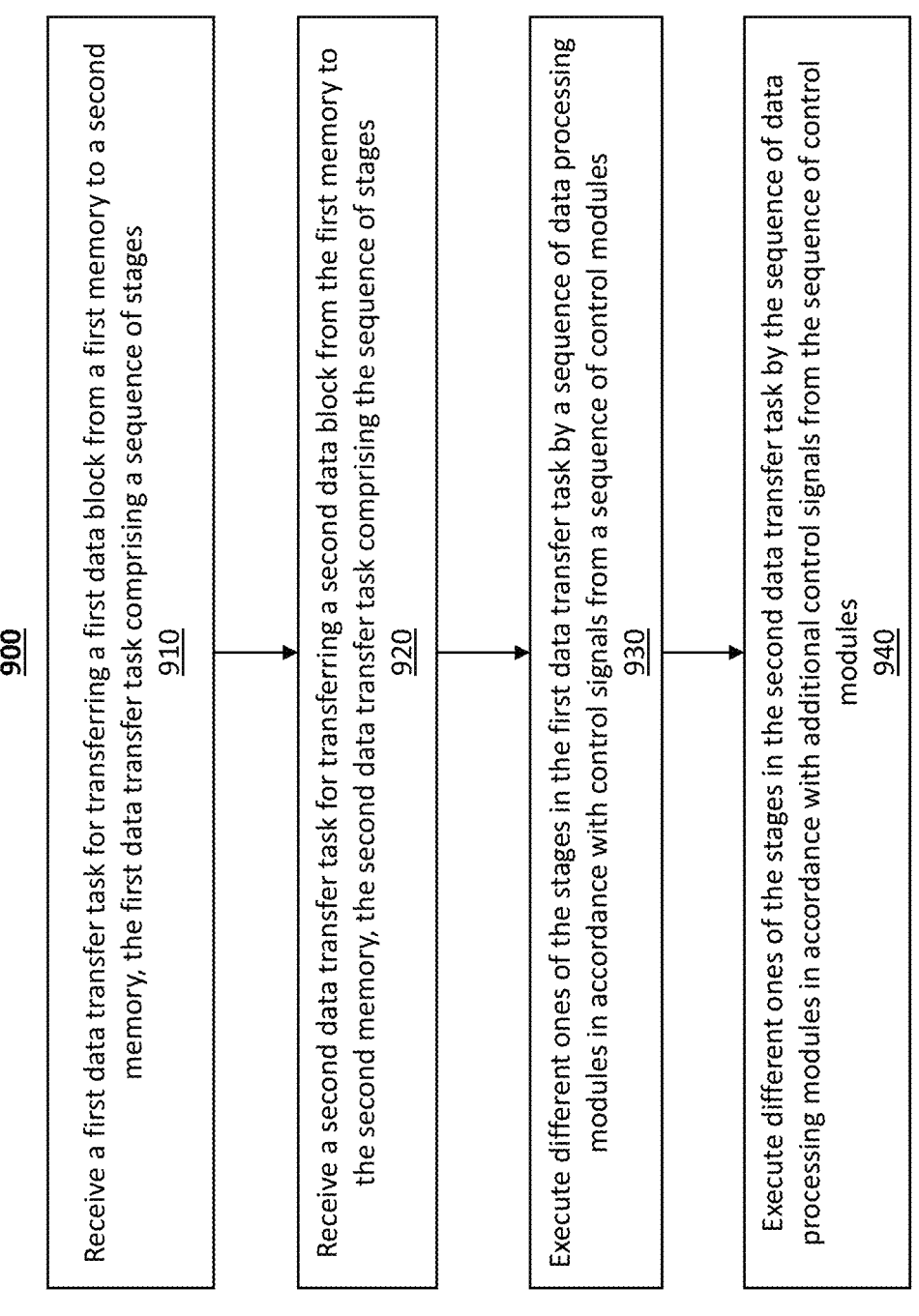

900

Receive a first data transfer task for transferring a first data block from a first memory to a second memory, the first data transfer task comprising a sequence of stages
910

Receive a second data transfer task for transferring a second data block from the first memory to the second memory, the second data transfer task comprising the sequence of stages
920

Execute different ones of the stages in the first data transfer task by a sequence of data processing modules in accordance with control signals from a sequence of control modules
930

Execute different ones of the stages in the second data transfer task by the sequence of data processing modules in accordance with additional control signals from the sequence of control modules
940

FIG. 9

DIRECT MEMORY ACCESS (DMA) ENGINE PROCESSING DATA TRANSFER TASKS IN PARALLEL

TECHNICAL FIELD

This disclosure relates generally to neural networks, and more specifically, to DNN (deep neural network) accelerators that include a DMA engine processing data transfer tasks in parallel.

BACKGROUND

DNNs are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as hundreds of millions of weights to be stored for classification or detection. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates multiple data transfer tasks executed in parallel, in accordance with various embodiments.

FIG. 9 is a flowchart showing a method of deep learning, in accordance with various embodiments.

DETAILED DESCRIPTION

Overview

Figure 1:
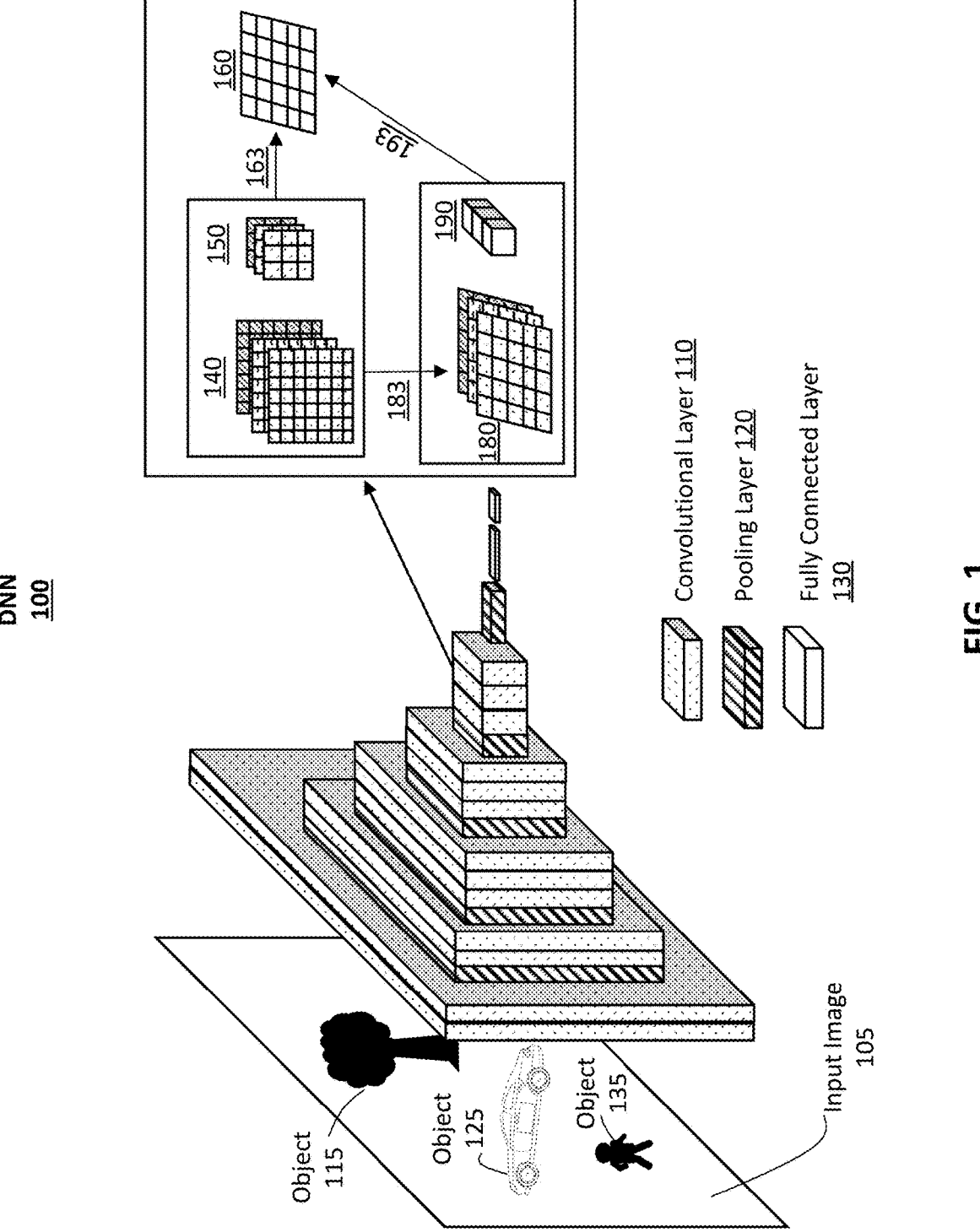
FIG. 1 illustrates an example DNN, in accordance with various embodiments.

The last decade has witnessed a rapid rise in AI (artificial intelligence) based data processing, particularly based on DNN. DNNs are widely used in the domains of computer vision, speech recognition, image, and video processing mainly due to their ability to achieve beyond human-level accuracy. The significant improvements in DNN model size and accuracy coupled with the rapid increase in computing power of execution platforms have led to the adoption of DNN applications even within resource constrained mobile and edge devices that have limited energy availability. DNN applications are usually run on DNN accelerators. Peak TOPS (Tera Operations Per Second) has been a metric to measure performance of DNN accelerators. For energy-constrained edge devices, two other metrics, $TOPS/mm^2$ (which indicates performance per area) and TOPS/W (which indicates performance per power) are also used.

DNN models can be executed by DNN accelerators. Execution of DNN models by DNN accelerators usually includes a set of two fundamental tasks: data transfer and computation. Data transfer tasks are affected by memory latency. Depending on the amount of data to be transferred, the memory latency can constitute a significant amount of the overall time of executing a data transfer task. As the execution of a DNN model may include many independent data transfer tasks, such as hundreds of data transfer tasks. The memory latency can significantly impair the performance of DNN accelerators. Thus, minimizing the impact of memory latency on data transfer tasks during execution of DNN models can be critical to improve performance of DNN accelerators.

Currently available solutions for increasing data transfer efficiency typically require increased operational frequency, hardware parallelism, hardware replication, or use of dedicated intermediate local buffering solutions (e.g., caches). However, these solutions can be expensive given the cost of the additional hardware that is required. Also, the increase of area and power has a negative impact on the overall TOPS/W of the DNN accelerators. The performance increase provided by these solutions is constrained by both process technology limits and high product cost. For instance, increased operation frequency is limited by manufacturing process technology and by power budget for the product and might drive increased external memory latency due to additional pipelining required to sustain increased frequency. Also, even though the use of parallel hardware engines for data transfer tasks can tolerate high latency, this solution requires additional area and power and therefore, the overall TOPS/W of the DNN accelerator can be reduced. And each single data transfer engine is still affected by low hardware utilization. Addition of local buffer adds on area and power cost and may not be compatible with many DNN models. Furthermore, depending on the amount of data transferred by each task, the local buffer might not even be fully exploited, leading to an actual reduction of TOPS/W of the DNN accelerator.

Therefore, the currently available solutions fail to effectively improve the efficiency of data transfer tasks in execution of DNN models. Improved technology for improving efficiency in data transfer by DNN accelerators is needed.

Embodiments of the present disclosure may improve on at least some of the challenges and issues described above by providing DNN accelerators that include an DMA engine capable of decomposing a data transfer task into a sequence of independent stages and processing multiple data transfer tasks in parallel. An example sequence of stages in a data transfer task includes a source stage for sending read requests to a first memory, a response stage for receiving and storing the data received from the first memory in response to a read request sent to the first memory, a destination stage for writing the data into a second memory, and a post sage for confirming the completion of the data transfer task.

In various embodiments of the present disclosure, the DMA engine includes a data transfer channel having a pipelined structure. The data transfer channel includes a datapath comprising a sequence of data processing modules and a controller comprising a sequence of control modules. Each respective control module may provide one or more control signals to a different data processing module in the datapath, and the data processing module can process a particular stage of a data transfer task in accordance with the control signals. The pair of a control module and the corresponding data processing module may constitute a channel stage in the data transfer channel. The data transfer channel includes a sequence of such channel stages for processing different stages of a data transfer task. As the different stages of a data transfer task can be processed independently, the data transfer channel may process multiple data transfer tasks in parallel. For instance, the data transfer channel can process the response stage of a first data transfer task and the source stage of a second data transfer task at the same time, as the source stage and response stage are processed by separate channel stages in the data transfer channel.

A channel stage may include a buffer to store data, e.g., data read from the first memory, in cases where the data cannot be processed by the next channel stage right away, e.g., due to memory latency. Additionally or alternatively, a channel stage may include a scheduler (also referred to as schedule module) that can place data transfer tasks in a queue, and the data transfer tasks can be processed based on their order in the queue.

Through parallel processing of data transfer tasks, the impact of memory latency on the time of executing the data transfer tasks can be reduced. For instance, after the source stage of a first task is finished by the source channel stage, the source channel stage can proceed to process the source stage of a second task, as opposed to waiting for the whole first task is completed. The data for the second task can be prefetched ahead of time so that the impact of memory read latency on the execution of the response stage of the second task may be reduced or even removed. Similarly, after the destination stage of the first task is finished by the destinate channel stage, the destination channel stage can proceed to process the destination stage of the second task, as opposed to waiting for the whole first task is completed. This way, the potential memory write latency for the second task, which can be incurred by the execution of the first job, can be reduced or removed.

Therefore, compared with the conventionally available solutions, the DMA engine can have better efficiency in data transfer for execution of DNN models. Moreover, the DMA engine in the present disclosure does not require increased operational frequency, hardware parallelism, hardware replication, or use of dedicated intermediate local buffers. Thus, the extra area and power, if any, needed by the DMA engine in the present disclosure is minimal. The overall performance of the DNN accelerator can be improved.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN

FIG. 1 illustrates an example DNN 100, in accordance with various embodiments. For purpose of illustration, the DNN 100 in FIG. 1 is a convolutional neural network (CNN). In other embodiments, the DNN 100 may be other types of DNNs. The DNN 100 is trained to receive images and output classifications of objects in the images. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers. In an inference of the DNN 100, the layers of the DNN 100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as input feature map (IFM) 140) and a filter 150. As shown in FIG. 1, the IFM 140 is represented by a 7×7×3 three-dimensional (3D) matrix. The IFM 140 includes 3 input channels, each of which is represented by a 7×7 two-dimensional (2D) matrix. The 7×7 2D matrix includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel a 2D matrix of weights, where the weights are arranged in columns and rows. A kernel can be smaller than the IFM. In the embodiments of FIG. 1, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as output feature map (OFM) 160). The OFM 160 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D matrix of output elements. As such, the 2D output matrix (i.e., the OFM 160) from the standard convolution 163 is referred to an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180. The depthwise output tensor 180 is represented by a 5×5×3 3D matrix. The depthwise output tensor 180 includes 3 output channels, each of which is represented by a 5×5 2D matrix. The 5×5 2D matrix includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculates the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new kernels and generates a new feature map. The new feature map may also be normalized and resized. The new feature map can be kernelled again by a further subsequent convolutional layer 110, and so on.

In some embodiments, a convolutional layer 110 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presents of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receives an input operand. The input operand defines the output of the convolutional layers 110 and pooling layers 120 and includes the values of the last feature map generated by the last pooling layer 120 in the sequence. The fully connected layers 130 applies a linear combination and an activation function to the input operand and generates an individual partial sum. The individual partial sum may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and returns an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input operand by the matrix containing the weights. In an example, the individual partial sum includes 3 probabilities: a first probability indicating the object 115 being a tree, a second probability indicating the object 125 being a car, and a third probability indicating the object 135 being a person. In other embodiments where the input image 105 includes different objects or a different number of objects, the individual partial sum can be different.

Example DNN Accelerator

Figure 2:
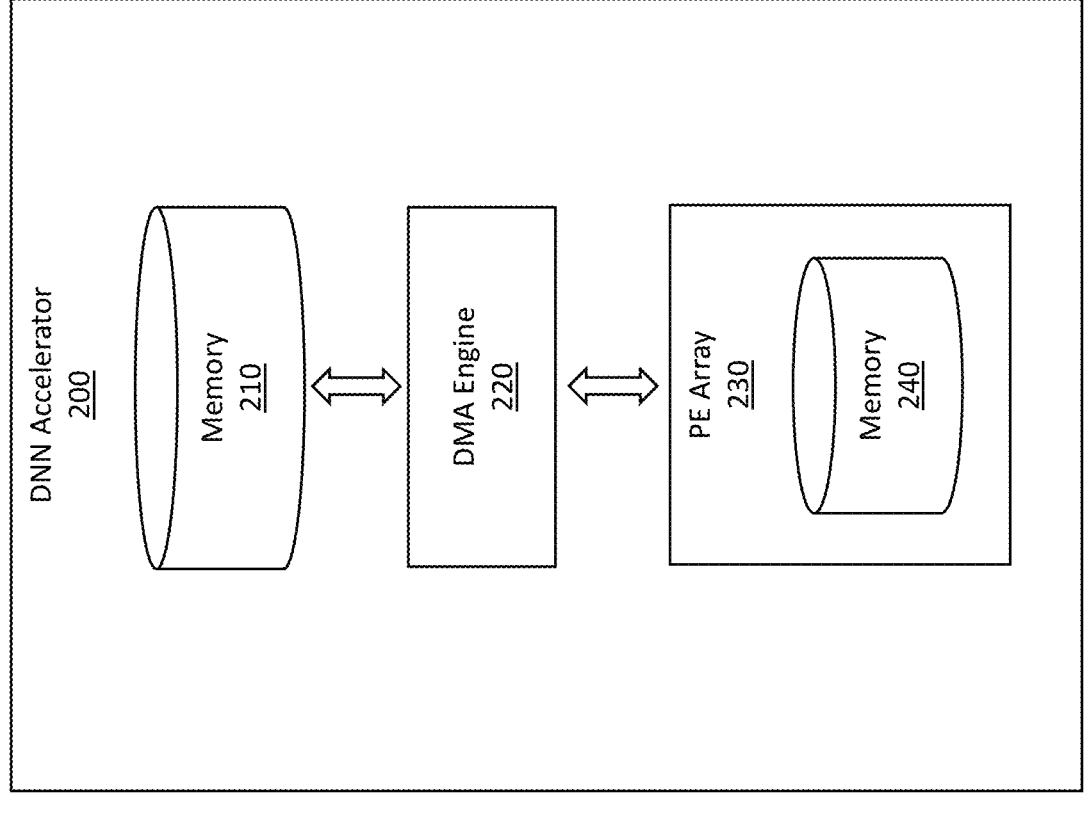
FIG. 2 is a block diagram of an example DNN accelerator, in accordance with various embodiments.

FIG. 2 is a block diagram of an example DNN accelerator 200, in accordance with various embodiments. The DNN accelerator 200 can run DNN models, e.g., the DNN 100 in FIG. 1. The DNN accelerator 200 includes a memory 210, a DMA engine 220, a PE array 230, and a memory 240 inside the PE array 230. In other embodiments, alternative configurations, different or additional components may be included in the DNN accelerator 200. For instance, the DNN accelerator 200 may include more than one memory 210 or 240, more than one DMA engine 220, or more than one PE array 230. As another example, the memory 240 may be partially or wholly outside the PE array 230. Further, functionality attributed to a component of the DNN accelerator 200 may be accomplished by a different component included in the DNN accelerator 200 or by a different system.

The memory 210 stores data to be used by the PE array 230 to perform deep learning operations in DNN models. Example deep learning operations include convolutions (also referred to as "convolutional operations"), pooling operations, elementwise operations, other types of deep learning operations, or some combination thereof. The memory 210 may be a main memory of the DNN accelerator 200. In some embodiments, the memory 210 includes one or more DRAMs (dynamic random-access memory).

In embodiments where the memory 210 stores data for a convolution, the memory 210 stores one or more filters for the convolution. A filter includes weights arranged in a 3D matrix. Weights can be read from the memory 210 and written into the memory 240 through the DMA engine 220. In some embodiments, the memory 210 may also store the input tensor and output tensor of the convolution. The output tensor can be transmitted from the memory 240 to the memory 210 through the DMA engine 220. In other embodiments, the input tensor or output tensor is not stored in the memory 210. For instance, the input tensor may be directly transmitted from an internal memory of another PE array to the memory 240 in the PE array 230. The output tensor may be directly transmitted from the memory 240 in the PE array 230 into an internal memory of another PE array. The input tensor includes activations arranged in a 3D matrix and includes a plurality of input channels. Examples of the input tensor include the input tensor 140 in FIG. 1. The output tensor includes activations arranged in a 3D matrix and includes a plurality of output channels. Examples of the output tensor include the output tensor 160 in FIG. 1.

The DMA engine 220 facilitates data transfer between the memory 210 and the memory 240. For example, the DMA engine 220 can read data from the memory 210 and write data into the memory 240. As another example, the DMA engine 220 can read data from the memory 240 and write data into the memory 210. The DMA engine 220 provides a DMA feature that allows the PE array 230 to initiate data transfer between the memory 210 and the memory 240 and to perform other operations while the data transfer is in program.

The DMA engine 220 may receive a set of data transfer tasks for a convolution. A data transfer task is a task of transferring a data block from a memory (e.g., the memory 210) to another memory (e.g., the memory 240). The data block may include one or more weights, one or more activations, sparsity data, other data associated with an operation by the DNN accelerator 200, or some combination thereof. The DMA engine 220 may receive the data transfer tasks from a compiler included in or otherwise associated with the DNN accelerator 200. These data transfer tasks may be independent from each other and can be processed by the DMA engine 220 separately. In some embodiments, the DMA engine 220 may process a set of data transfer tasks in accordance with a temporal sequence. For instance, the DMA engine 220 may determine an order in which the data transfer tasks will be processed. The DMA engine 220 may use a first-in-first out (FIFO) method to determine the order. The DMA engine 220 process the first data transfer tasks it received first.

To process a data transfer tasks, the DMA engine 220 may read the data block from a memory and then write the data block into the other memory. The DMA engine 220 may include a datapath and a controller. The data path processes a data transfer task. The data transfer task includes a data flow along the data path. The data flow may include multiple stages. The data path may include multiple data processing modules to process these stages. Each data processing module may process a different stage. The controller can provide control signals to the data path so that the data path can process the data transfer task in accordance with the control signals. The controller may include multiple control modules that controls the data processing modules in the data path. Each control module may control a different data processing module.

As different stages of a data processing task can be processed by different processing modules, which are separately controlled by different control modules, the DMA engine 220 may process multiple data transfer tasks in parallel, i.e., at the same time. For instance, the DMA engine 220 may process the second stage of the first data transfer task while processing the first stage of the second data transfer task. The DMA engine 220 may also start processing the third data transfer task before it finishes the first data transfer task or the second data transfer task. Compared with conventional DMA engines that cannot process a data process task until the previous data process task is finished, the utilization of the hardware components in the DMA engine 220 is better. Thus, the efficiency and performance of the DNN accelerator 200 can be improved. For instance, both TOPS/mm$^2$ and TOPS/W of the DNN accelerator 200 can be increased. More details regarding the DMA engine 220 are described below in conjunction with FIGS. 3-6.

The PE array 230 includes a plurality of PEs. The PEs may be arranged in columns, or columns and rows. The PE array 230 may be a tile, or a portion of a tile, of a DNN layer having a tile architecture. The DNN layer may include one or more other PE arrays that may operate in parallel with the PE array 230. The PE array may perform convolutions, e.g., standard convolution or depthwise convolution. In some embodiments, the PE array 230 receive an input tensor and a weight tensor and performs MAC operations with the input tensor and weight tensor. The weight tensor may be in a linear form. For instance, the weight tensor has been rearranged to a group of linear data structure. The result of the MAC operations may be an output tensor, which can be further computed, e.g., by another PE array. The input tensor, weight tensor, and output tensor may be stored in the memory 240. More details about PE array are described below in conjunction with FIGS. 9 and 10.

The memory 240 is local to the PE array 230. In the embodiments of FIG. 2, the memory 240 is inside the PE array 230. In other embodiments, the memory 240 may be outside the PE array 230. The memory 240 and the PE array 230 can be implemented on the same chip. In some embodiments, the memory 240 includes one or more SRAMs (static random-access memories). The memory 240 may be register files, e.g., register files 1140, 1150, and 1160 in FIG. 11. In some embodiments, the memory 240 may also include one or more cache memories. The memory 240 stores data used for or generated from convolutions, e.g., input tensors, weight tensors, and output tensors. An input tensor or weight tensor may be written into the memory 240 by the DMA engine 220. A weight tensor stored in the memory 240 may have been rearranged by the DMA engine 220 into one or more linear data structures. An output tensor may be loaded into the memory 240 by the PEs in the PE array 230.

Example DMA Engine

Figure 3:
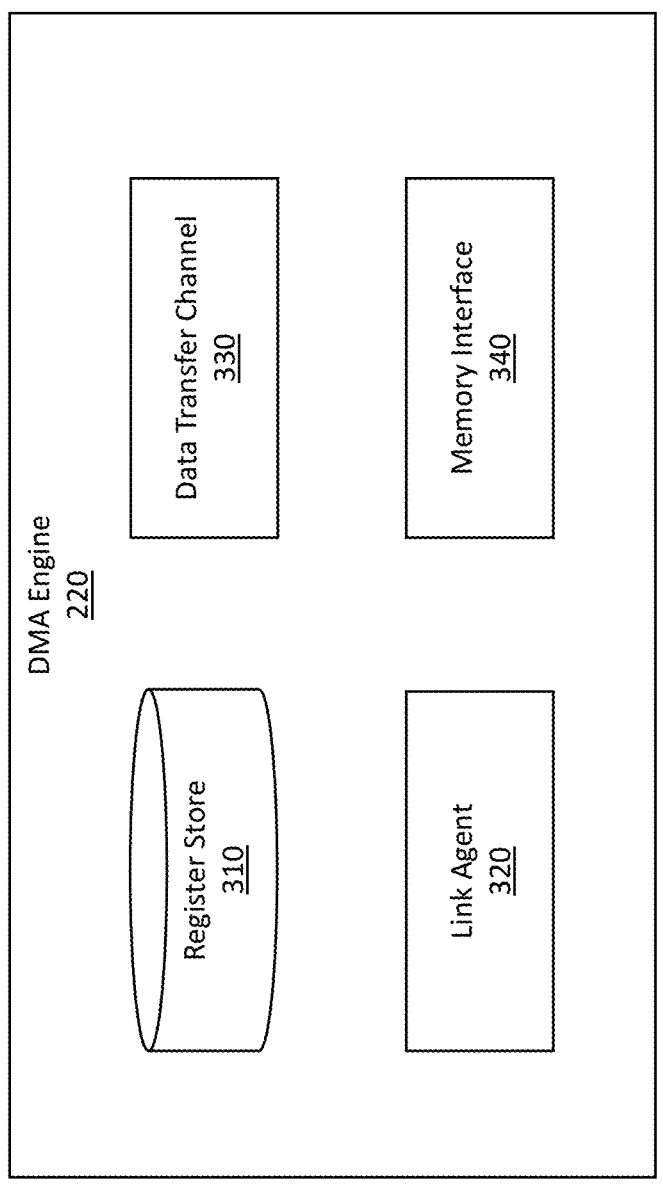
FIG. 3 is a block diagram of a DMA engine, in accordance with various embodiments.

FIG. 3 is a block diagram of the DMA engine 220, in accordance with various embodiments. The DMA engine 220 includes a register store 310, a link agent 320, a data transfer channel 330, and a memory interface 340. In other embodiments, alternative configurations, different or additional components may be included in the DMA engine 220. Further, functionality attributed to a component of the DMA engine 220 may be accomplished by a different component included in the DMA engine 220, a different component in the DNN accelerator 200, or by a different system. The DMA engine 220 may be at least partially implemented in hardware. Some functions of the DMA engine 220 may be implemented in software.

The register store 310 stores configuration registers and state registers of the DMA engine 200. In some embodiments, the register store 310 receives configuration registers, e.g., from a compiler associated with the DNN accelerator 200. A configuration register may specify a configuration of the DMA engine 220 for an operation of the DMA engine 220. The configuration registers may provide information of configurations of components of the DMA engine 220, e.g., configurations of the data transfer channel 330 or components in the data transfer channel 330. For instance, the configuration registers may specify configurations about data buffer, data width, read capacity, write capability, and so on. The register store 310 may provide configuration registers to the data transfer channel 330 for the data transfer channel 330 to operate in accordance with the configuration registers.

The register store 310 may also receive state registers, e.g., from the data transfer channel 330. A state register may specific a status of the DMA engine 220 for an operation of the DMA engine 220. The state registers may provide information of states of components of the DMA engine 220, e.g., states of the data transfer channel 330 or components in the data transfer channel 330. In an example, a state register may indicate a status of a data path (or a portion of the datapath) in the data transfer channel 330. The status may be idle, wait, busy, and so on.

The link agent 320 receives data transfer tasks. A data transfer task is a task of reading a data block from a first memory and writing the data block into a second memory. The data block may be stored at an address in the first memory, and the address may be referred to as a read address. The data block may also have a write address, which is an address in the second memory to which the data block will be written. In some embodiments, a read address or write address is associated with a fixed number of bytes. The fixed number may be, for example, 32, 64, or other numbers. The number of bytes in the data block may not exceed the fixed number. The data block may be data to be used by the PE array 230 for performing a deep learning operation or data that was generated by the PE array 230 from a deep learning operation performed by the PE array 230. In an example where the deep learning operation is a convolution, the data block may include one or more weights in a kernel of the convolution, one or more activations in an input tensor of the convolution, one or more activations n an output tensor of the convolution, or some combination thereof.

In some embodiments, the link agent 320 receives a task description for each data transfer task. The link agent 320 may retrieve the task description from a memory, e.g., the memory 210. The link agent 320 reads task descriptors of data transfer tasks from a memory, e.g., the memory 210. The task descriptor of a data transfer task includes information describing one or more attributes of the data transfer task, such as the size of the data block (e.g., the number of bytes in the data block, etc.) to transfer, the memory address to read the data, the memory address to write the data, and so on. The reading of the task descriptor by the link agent 320 may be referred to as task descriptor fetch. In some embodiments, after the link agent 320 reads the task descriptor, the execution of the data transfer task may be started. The link agent 320 may provide the task descriptor of a data transfer task to the data transfer channel 330 for the data transfer channel 330 to process the data transfer task.

The data transfer channel 330 executes data transfer tasks. In some embodiments, the data transfer channel 330 may operate in accordance with configuration registers from the register store 310. The data transfer channel 330 may also provide state registers to the register store 310, e.g., as the status of components in the data transfer channel 330 changes. The data transfer channel 330 may execute a data transfer task based on the task descriptor of the data transfer task. For instance, the data transfer channel may read the data block from the read address specified in the task descriptor and write the data block to the write address specified in the task descriptor. In embodiments where the data transfer channel 330 needs to buffer the data block during the execution of the data transfer task, the data transfer channel 330 may reserve sufficient storage space in a buffer inside the data transfer channel based on the size of the data block. The data transfer channel 330 can execute multiple data transfer tasks in parallel to minimize latency and maximize utilization. Certain aspects about the data transfer channel 330 are provided below in conjunction with FIG. 4.

The memory interface 340 facilitates communications of the DMA engine 220 with the memories 210 and 240. In some embodiments, the data transfer channel 330 may communication with the memories 210 and 240 through the memory interface 340. For instance, the data transfer channel 330 may send read requests (i.e., requests to read data) to the memory 210 through the memory interface 340. The data transfer channel 330 may send write requests (i.e., requests to write data) to the memory 240 through the memory interface 340. The data transfer channel 330 may also receive responses to the read request and write requests from the memories 210 and 240 through the memory interface 340.

Even though FIG. 3 shows one memory interface 340, the DMA engine 220 may include multiple memory interfaces 340. For example, the DMA engine 220 may include two memory interfaces 340: one for communicating with the memory 210, and the other one for communicating with the memory 240. In another example, the DMA engine 220 may include two memory interfaces 340 for a memory 210 or 240: one for sending requests to the memory 210 or 240 and the other one for receiving responses from the memory 210 or 240.

Example Data Transfer Channel with Pipelined Structure

Figure 4:
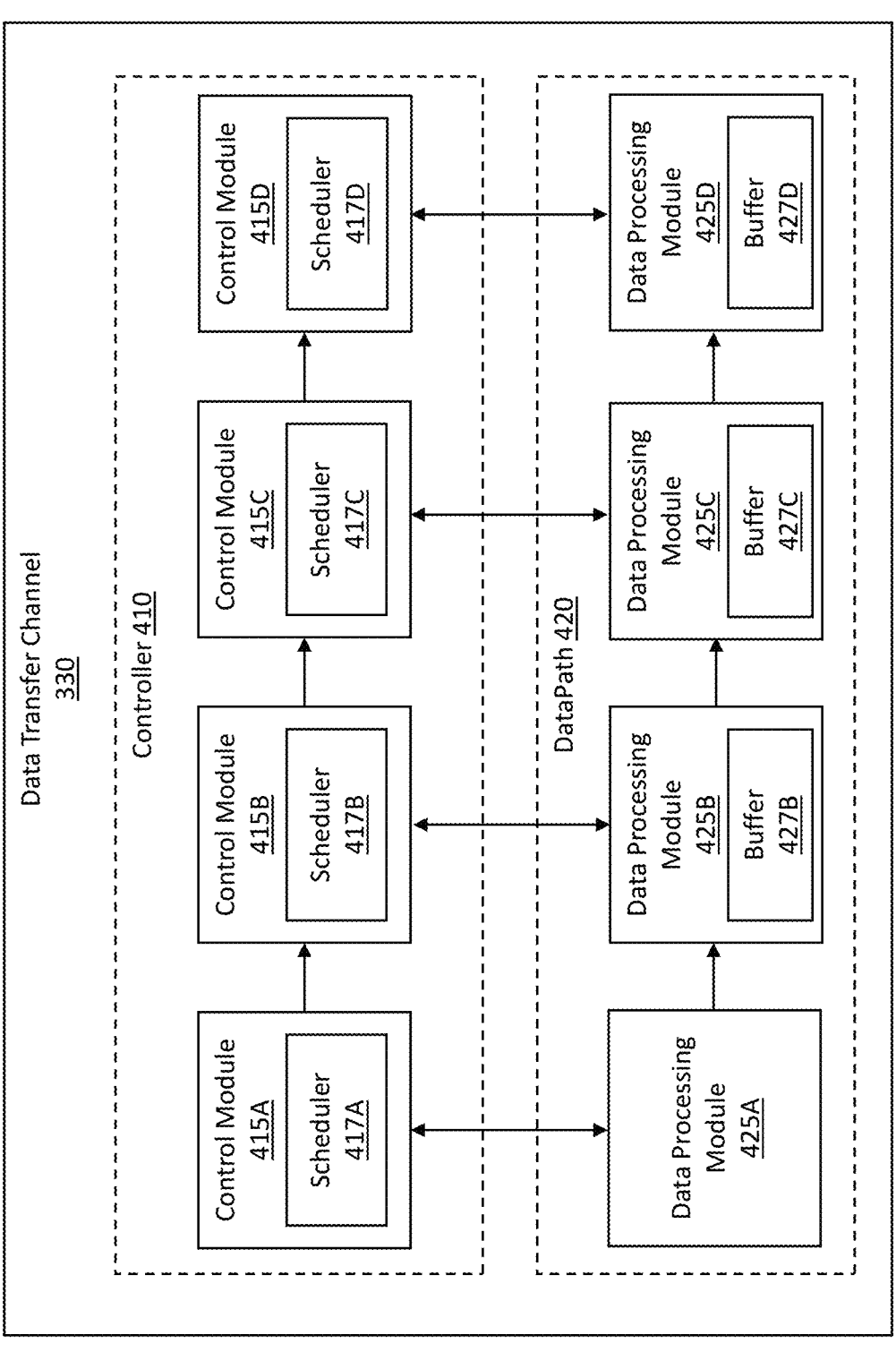
FIG. 4 is a block diagram of a data transfer channel, in accordance with various embodiments.

FIG. 4 is a block diagram of the data transfer channel 330, in accordance with various embodiments. The data transfer channel 330 includes a controller 410 and a datapath 420. The controller 410 provides control signals to the datapath 420, under which the datapath 420 executes data transfer tasks. In the embodiments of FIG. 4, the controller 410 includes four control modules 415A-415D (collectively referred to as "control modules 415" or "control module 415"). The datapath 420 includes four data processing modules 425A-425D (collectively referred to as "data processing modules 425" or "data processing module 425"). In other embodiments, alternative configurations, different or additional components may be included in the data transfer channel 330. For instance, the data transfer channel 330 may include a different number of control modules 415 or a different number of data processing modules 425. Further, functionality attributed to a component of the data transfer channel 330 may be accomplished by a different component included in the data transfer channel 330 or by a different system. The data transfer channel 330 may be at least partially implemented in hardware. Some functions of the data transfer channel 330 may be implemented in software.

As the controller 410 includes four control modules 415 and the datapath 420 includes four data processing modules 425, a data transfer task may be executed through four pipelined but separate stages. In some embodiments, the four stages include a source stage, a response stage, a destination stage, and a post stage. The stages may be in a sequence, i.e., they may be processed in a temporal order. A data transfer task may start with the source stage, then the response stage, then the destination stage, and finally the response stage. There may be delay between these stages. For instance, after the response stage is finished, it takes some time before the destination stage can start.

The data processing modules 425 execute the four stages of a data transfer task with control signals provided by the control modules 415. As each stage can be processed by a separate control module 415 and a separate data processing module 425, the stages of the data transfer task can be executed separately. Different stages of different data transfer tasks can be processed at the same time. For instance, the control module 415A and data processing module 425A may process the source stage of a data transfer task while the control module 415B and data processing module 425B are processing the response stage of another data transfer task. At the same time, the control module 415C and data processing module 425C may be processing the destination stage of yet another data transfer task. In some cases, the control module 415D and data processing module 425D may be processing the post stage of yet another data transfer task at the same time. Accordingly, the data transfer channel 330 may process up to four data transfer tasks in parallel.

The data processing module 425A executes the source stage of data transfer tasks under control signals from the control module 415A. The data processing module 425A may generate read request and send the read requests to the memory 210. A read request may correspond to a data transfer task and may be a request to read the data block of the data transfer task from the memory 210. A read request may include an address in the memory 210 from which data can be fetched.

The control module 415A may generate the control signals based on task descriptors of the data transfer tasks, e.g., the size of to-be-read data blocks, the read addresses, or other information in the task descriptors. The control module 415A may include a finite-state machine (FSM), a micro-controller, a programmable controller, or any other type of modules that can control executions of data transfer tasks. The control module 415A includes a scheduler 417A that can schedule execution of the source stage of multiple data transfer tasks, e.g., in embodiments where the data transfer channel 330 receives multiple data transfer tasks. The scheduler 417A may maintain a queue for outstanding response stages of the data transfer tasks, where the data transfer tasks are arranged in an order. In some embodiments, the scheduler 417A determines the order of the data transfer tasks in the queue based on a FIFO method.

The scheduler 417A may select a data transfer task, e.g., the first data transfer task, to process. The scheduler 417A then transmits the control signal for the source stage of the first data transfer task to the data processing module 425A and instructs the data processing module 425A to execute the source stage. In accordance with the control signal, the data processing module 425A issues a request for data to the memory 210. The request may include the read address, the size of the data block that is to be read from the memory 210, and so on. After the request is issued, the data processing module 425A may notify the scheduler 417A that the execution is done. The scheduler 417A, after receiving the notification, may process the second data transfer task in the queue and sends a request to the data processing module 425A to process the source stage of the second data transfer task. This process may continue till the last data transfer task in the queue is processed.

With the scheduler 417A, the data processing module 425A may issue read requests to the memory 210 for different data transfer tasks. In some embodiments, the memory 210 may have a latency to process the requests from the data processing module 425A. The data processing module 425A may issue read requests for multiple data transfer tasks despite the latency of the memory 210, as responses from the memory 210 is processed by the data processing module 475B. The data processing module 425A may issue read requests for a second data transfer task while the data processing module 425B is processing the responses of the memory 210 to the read requests for the first data transfer task.

After the data processing module 425A finishes the request stage of a data transfer task, the data processing module 425A may notify the control module 415A that the request stage of the data transfer task is finished or that the current state of the data processing module 425A is idle so that the data processing module 425A is available for processing the next data transfer task. Based on the notification, the scheduler 417A may release the data transfer task from the queue and sends the next data transfer task in the queue to the data processing module 425A. The scheduler 417A may also transmits the data transfer task to the control module 415B for processing the response stage of the data transfer task.

The data processing module 425B executes the response stage of data transfer tasks in accordance with control signals from the control module 415B. In the response stage, the data processing module 425B receives and processes responses from the memory 210, e.g., in response to read requests issued by the data processing module 425A. In some embodiments, the response from the memory 210 may include the data requested by the data processing module 425A. In other embodiments, the response for the memory 210 may indicate that the requested data is ready for being read from the memory 210. After receiving the response, the data processing module 425 may read the data from the memory 210, e.g., based on a control signal from the control module 415B.

The control module 415B may generate the control signal based on the task descriptor of the data transfer task, e.g., the size of to-be-read data block, the read address, or other information in the task descriptor. The control module 415B includes a scheduler 417B that can schedule execution of the response stage of multiple data transfer tasks, e.g., in embodiments where the data transfer channel 330 receives multiple data transfer tasks. The scheduler 417B may maintain a queue for outstanding response stages of the data transfer tasks, where the data transfer tasks are arranged in an order. In some embodiments, the scheduler 417B determines the order of the data transfer tasks in the queue based on a FIFO method. The scheduler 417B may receive a data transfer task from the control module 415A, e.g., after the data transfer task is released from the scheduler 417A. The scheduler 417B may place the data transfer tasks in a queue, e.g., based on the order of the scheduler 417B receiving these data transfer tasks. The scheduler 417B may process the first received data transfer task first.

The scheduler 417B then transmits the control signal for the response stage of the first data transfer task to the data processing module 425B and instructs the data processing module 425B to execute the response stage. In accordance with the control signal, the data processing module 425B receives and stores the data block from the memory 210. After the data requested by the data processing module 425A is received and received by the data processing module 425B, the data processing module 425B may notify the scheduler 417B that the execution of the response stage is done. The scheduler 417B, after receiving the notification, may process the second data transfer task in the queue and sends a request to the data processing module 425B to process the response stage of the second data transfer task. This process may continue till the last data transfer task in the queue is processed.

The data processing module 425B includes a buffer 427B that can temporarily store data blocks received by the data processing module 425B but cannot be written into the memory 240, e.g., due to memory latency or limited memory bandwidth. The size of the buffer 427B may be determined based on sizes of data blocks, latency of the memory 240, other factors, or some combination thereof. After the data processing module 425B processes and stores the received read data, the data processing module 425B may send a notification to the scheduler 417B. The notification may indicate that the response stage of the data transfer task is done, or that the status of the data processing module 425B is idle, so that the data processing module 425B is available to process the next data transfer task. Based on the notification, the scheduler 417B may release the data transfer task from the queue and sends the next data transfer task in the queue to the data processing module 425B. The scheduler 417B may send the released data transfer task to the control module 415C for processing the next stage of the data transfer task.

The data processing module 425C executes the destination stage in accordance with control signals from the control module 415C. In the destination stage, the data processing module 425C writes data blocks into the memory 240. The data processing module 425C may generate write request and sending the write requests to the memory 240. A write request is a request to write a data block into the memory 240, e.g., to a specific address in the memory 240.

The control module 415C may generate the control signal for a data transfer task based on the task descriptor of the data transfer task, e.g., the size of to-be-read data block, the write address, or other information in the task descriptor. The control module 415C includes a scheduler 417C that can schedule execution of the destination stage of multiple data transfer tasks, e.g., in embodiments where the data transfer channel 330 receives multiple data transfer tasks. The scheduler 417C may maintain a queue for outstanding destination stages of the data transfer tasks, where the data transfer tasks are arranged in an order. In some embodiments, the scheduler 417C determines the order of the data transfer tasks in the queue based on a FIFO method. The scheduler 417C may receive a data transfer task from the scheduler 417B, e.g., after the data transfer task is released from the scheduler 417B. The scheduler 417C may place the data transfer tasks in a queue, e.g., based on the order of the scheduler 417C receiving these data transfer tasks. The scheduler 417C may process the first received data transfer task first.

The scheduler 417C then transmits the control signal for the destination stage of the first data transfer task to the data processing module 425C and instructs the data processing module 425C to execute the destination stage. The data processing module 425C reads the data block of the data transfer task from the data processing module 425B, e.g., from the buffer 427B. Then the data processing module 425C create a data cycle for memory write, e.g., a data cycle for writing the data block into the memory 240. After the data cycle for memory write is created, the data processing module 425C may notify the scheduler 417C that the execution of the destination stage is done. The scheduler 417C, after receiving the notification, may process the second data transfer task in the queue and sends a request to the data processing module 425C to process the destination stage of the second data transfer task. This process may continue till the last data transfer task in the queue is processed.

In some embodiments, the data processing module 425C includes a buffer 427C that can temporarily store data blocks to be written into the memory 240. Due to memory latency or limited memory bandwidth, the data processing module 425C may not be able to immediately write every data block into the memory 240. The data processing module 425C can store data blocks in the buffer and move on to process the next data transfer task. The size of the buffer 427C may be determined based on sizes of data blocks, latency of the memory 240, other factors, or some combination thereof.

After the data processing module 425C writes the data block, the data processing module 425C may notify the scheduler 417C that the destination stage of the data transfer task is done, or that the status of the data processing module 425C is idle, so that the data processing module 425C is available to process the next data transfer task. Based on the notification, the scheduler 417C may release the data transfer task from the queue and sends the next data transfer task in the queue to the data processing module 425C. The scheduler 417C may send the released data transfer task to the control module 415D for processing the next stage of the data transfer task.

The data processing module 425D executes the post stage in accordance with control signals from the control module 415D. The data processing module 425D may receive memory responses to the write request sent by the data processing module 425C and determines whether the requested memory writes are completed. For instance, the data processing module 425D determines whether the data block for a data transfer task has been written into the write addresses in the memory 240 based on a response from the memory 240. This is to ensure coherency of next actions versus a data consumer. After determining that the memory task for the data transfer task is done, the data processing module 425D may notify the DNN accelerator 200 (e.g., the PE array 230) of the completion of the data transfer task, e.g., through a processor interrupt mechanism. For instance, the data processing module 425D may generate and send out a notification for task completion.

The control module 415D may generate the control signal for the post stage of a data transfer task based on the task descriptor of the data transfer task, e.g., the size of to-be-read data block, the write address, or other information in the task descriptor. The control module 415D includes a scheduler 417D that can schedule execution of the post stage of multiple data transfer tasks, e.g., in embodiments where the data transfer channel 330 receives multiple data transfer tasks. The scheduler 417D may maintain a queue for outstanding post stages of the data transfer tasks, where the data transfer tasks are arranged in an order. In some embodiments, the scheduler 417D determines the order of the data transfer tasks in the queue based on a FIFO method. The scheduler 417D may receive a data transfer task from the scheduler 417C, e.g., after the data transfer task is released from the scheduler 417C. The scheduler 417D may place the data transfer tasks in a queue, e.g., based on the order of the scheduler 417D receiving these data transfer tasks. The scheduler 417D may process the first received data transfer task first.

The scheduler 417D then transmits the control signal for the post stage of the first data transfer task to the data processing module 425D and instructs the data processing module 425D to execute the post stage.. After the data processing module 425D executes the post stage (e.g., after the data processing module 425D sends out task completion notification), the data processing module 425D may notify the scheduler 417D that the execution of the post stage is done or that the status of the data processing module 425D is idle. The scheduler 417D, after receiving the notification, may process the second data transfer task in the queue and sends a request to the data processing module 425D to process the post stage of the second data transfer task. This process may continue till the last data transfer task in the queue is processed. The scheduler 417D may release the data transfer task that has been completed from the queue.

The data processing module 425D includes a buffer 427D that can temporarily store task completion notifications generated by the data processing module 425D, e.g., in embodiments where the data processing module 425D may not be able to immediately send out the task completion tasks.

In the embodiments of FIG. 4, the control modules 415 may operate separately from each other. Also, the data processing modules 425 may operate separately from each other. It can be considered that the data transfer channel 330 includes a sequence of four channel stages. The control module 415A and data processing module 425A constitute a source channel stage that processes the source stage of each data transfer task. The control module 415B and data processing module 425B constitute a response channel stage that processes the response stage of each data transfer task. The control module 415C and data processing module 425C constitute a destination channel stage that processes the destination stage of each data transfer task. The control module 415D and data processing module 425D constitute a post channel stage that processes the post stage of each data transfer task. An action of each channel stage may not depend on actions of the other channel stages.

Latency during the execution of data transfer tasks (e.g., read latency associated with the memory 210, write latency associated with the memory 240, etc.) can be handled by the schedulers 417A-427D (collectively referred to as "schedulers 417" or "scheduler 417") and buffers 427B-427D (collectively referred to as "buffers 427" or "buffer 427"). In the embodiments of FIG. 4, every control module 415 in FIG. 4 includes a scheduler 417 and every data processing module 425 includes a buffer 427. In other embodiments, one or more of the schedulers 417 may be optional. Alternatively or additionally, one or more data processing modules 435 (e.g., the data processing module 425A, 425C, or 425D) may not include any buffer. With the independent control modules 415 and independent data processing modules 425, the data transfer channel 330 may process the four stages of a data transfer task separately.

This enables the data transfer channel 330 to process multiple data transfer tasks in parallel. For instance, the data processing modules 425 may process different stages of different data transfer tasks. The data transfer channel 330 may process up to four data transfer tasks in parallel. This can increase the utilization of the hardware components of the data transfer channel 330 and reduce the time need to complete a set of data transfer tasks.

Figure 5:
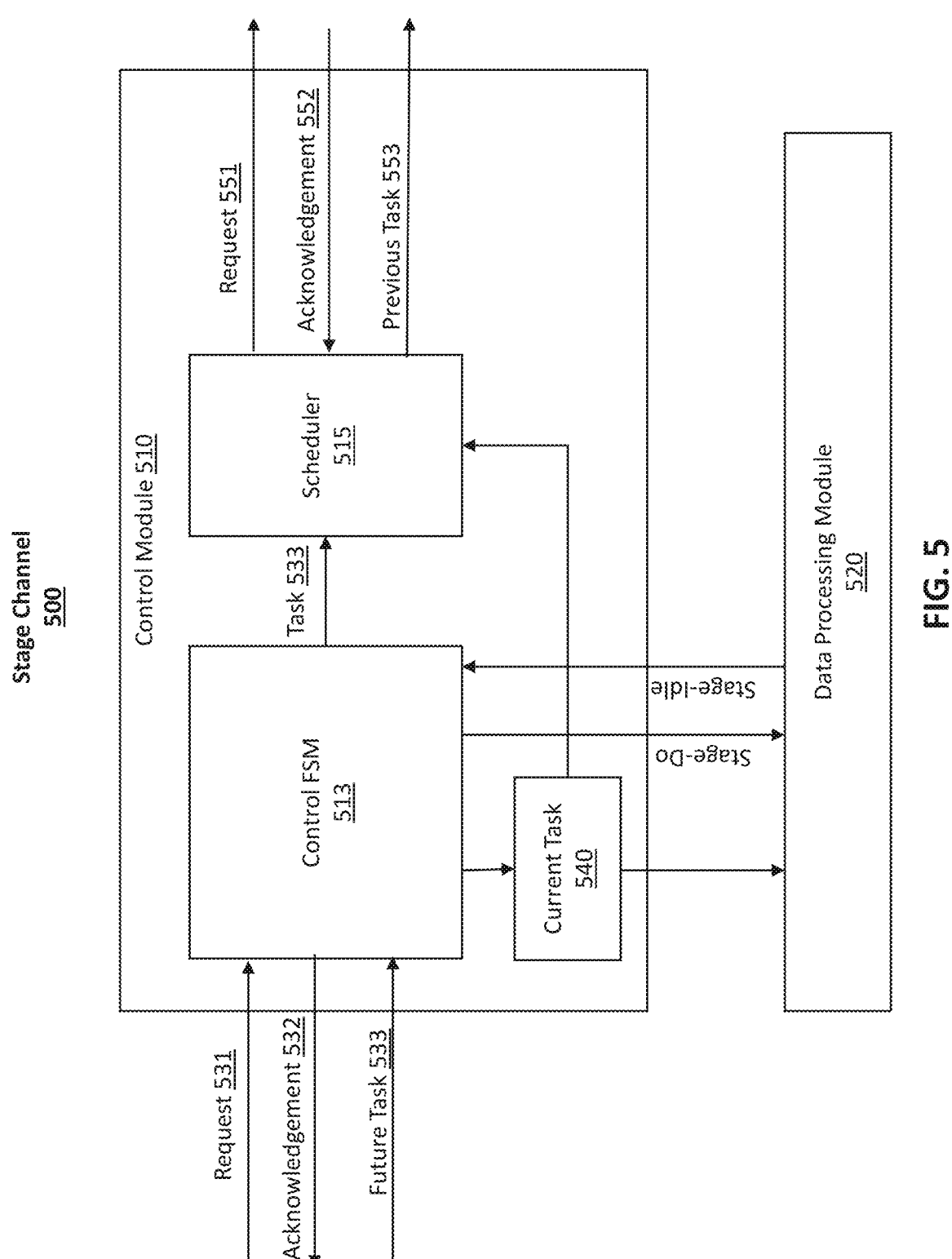
FIG. 5 illustrates activities of an example control module in a channel stage, in accordance with various embodiments.

FIG. 5 illustrates activities of an example control module 510 in a channel stage 500, in accordance with various embodiments. The channel stage 500 may be a portion of the data transfer channel 330 that handles a particular stage of data transfer tasks. The particular stage may be a source stage, response stage, destination stage, or post stage. The channel stage 500 includes a control module 510 and a data processing module 520.

The control module 510 can schedule and control execution of the state. The control module 510 may also control propagation of data transfer tasks to the subsequent channel stage. The subsequent channel stage may be another portion of the data transfer channel 330 that handles the subsequent stage of data transfer tasks. The control module 510 may be an example of one of the control modules 415 in FIG. 4.

As shown in FIG. 5, the control module 510 includes a control FSM 513 and a scheduler 515. The control FSM 513 receives a request 531, e.g., from a control module for a previous stage of the data transfer task. The request 531 may be a request for taking a future task 533. The future task 533 may be a data transfer task. The control FSM 513 may acknowledge the receipt of the request by sending out an acknowledgement 532. After sending out the acknowledgement 532, the control FSM 513 receives the future task 533. The control FSM 513 may push the future task 533 into the scheduler 515, e.g., after a determination that it cannot process the control FSM 513 at the time. The scheduler 515 may place the future task 533 in a queue. For instance, the scheduler 515 may put the future task 533 at the end of the queue.

The control FSM 513 receives a "Stage-Idle" notification from the data processing module 520. The "Stage-Idle" notification indicates that the data processing module 520 has finished execution of a previous task 553 and is now in an idle state. Based on the notification, the scheduler 515 can release the previous task 553 from the queue and propagate the current task 540 to the next channel stage. As shown in FIG. 5, the scheduler 515 sends a request 551 to the control FSM in the next channel stage and receives an acknowledgement 552 of the request. The request may be a request for receiving the previous task 553. The scheduler 515 sends previous task 553 to the next channel stage based on the acknowledgement 552.

The data processing module 520 receives the current task 540 form the control FSM 513. The data processing module 520 also receives a control signal "Stage-Do" to the data processing module 520, the control signal instructs the data processing module 520 to execute the current task 540 stage of the data transfer task. The data processing module 520 can then execute the current task 540. In the embodiments of FIG. 5, the previous task 553, current task 540, and future task 533 may be three different data transfer tasks that are processed by the data transfer channel 330 in parallel.

Figure 6:
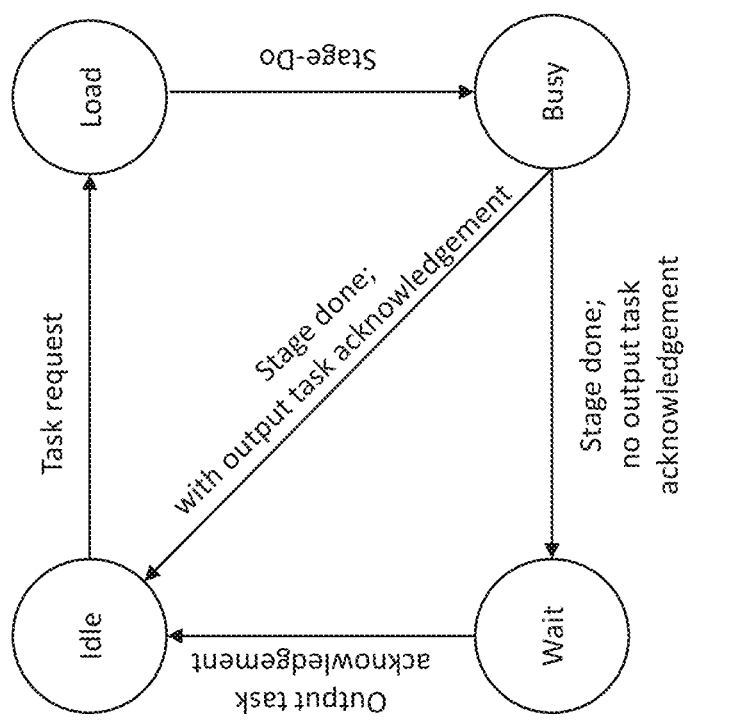
FIG. 6 illustrates example states of a data processing module, in accordance with various embodiments.

FIG. 6 illustrates example states of a data processing module, in accordance with various embodiments. The data processing module may be one of the data processing modules 425 in FIG. 4 or the data processing module 520 in FIG. 5. The states of the data processing module may be partially or wholly controlled by a control module, e.g., one of the control modules 415 in FIG. 4 or the control module 510 in FIG. 5.

The states shown in FIG. 6 include idle, load, busy, and wait. When the data processing module is in the idle state, a new input task is accepted and loaded on the task control outputs. Once loaded, the task information is visible by the data processing module, and the data processing module may start executing a particular stage of the task in accordance with a control signal (e.g., Stage-Do) from the control module. The control module monitors the state of the data processing module to detect when the task execution has completed. For instance, the control module may determine that the task execution has completed based on a signal (e.g., Stage-Idle) from the data processing module. The control module then can propagate the task across the control pipeline.

During the execution of the stage of the task, the data processing module is in the busy state. After the execution is done, the data processing module may switch to the wait state in embodiments where the output acknowledgement has not been sent out. The data processing module may change from the wait state to the idle state after the output acknowledgement is sent out. In embodiments where the data processing module finishes the execution of the stage of the task and sends out the output acknowledgement immediately or simultaneously, the data processing module can change from the busy state to the idle state directly.

Example Parallel Executions of Data Transfer Tasks

Figure 7:
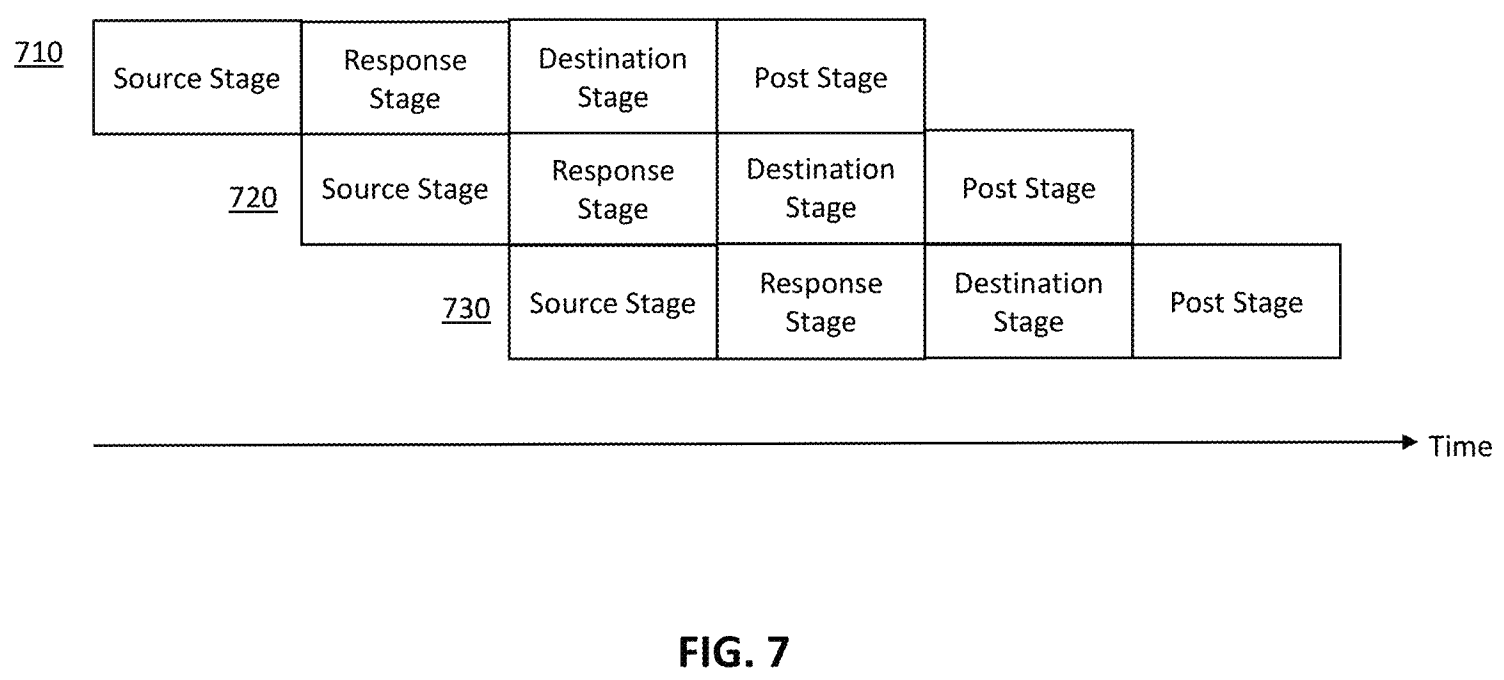

FIG. 7 illustrates multiple data transfer tasks 710, 720, and 730 executed in parallel, in accordance with various embodiments. The data transfer tasks 710, 720, and 730 may be executed by the data transfer channel 330 in FIG. 3. The data transfer tasks 710, 720, and 730 may also be referred to as tasks 710, 720, and 730. As shown in FIG. 7, each task includes four stages: source stage, response state, destination stage, and post stage. FIG. 7 illustrates a timeline in which the stages of the tasks 710, 720, and 730 are executed. Different stages of different data transfer tasks can be processed at the same time.

As shown in FIG. 7, the response stage of the task 710 and the source stage of the task 720 are executed at the same time. Also, the destination stage of the task 710, the response stage of the task 720, and the source stage of the task 730 are executed simultaneously. Similarly, the post stage of the task 710, the destination stage of the task 720, and the response stage of the task 730 are executed simultaneously. Further, the post stage of the task 720 and the destination stage of the task 730 are executed at the same time. Such parallel executions of multiple data transfer tasks allow the data transfer channel 330 to "overlap" processing the tasks 710, 720, and 730 and therefore, can maximize the utilization of the data transfer channel 330. For instance, the data processing modules 425 may process a data transfer task before the precedent data transfer task (or multiple precedent tasks) is wholly completed. The advantage of parallel execution of multiple tasks is further shown in FIG. 8.

Figure 8:
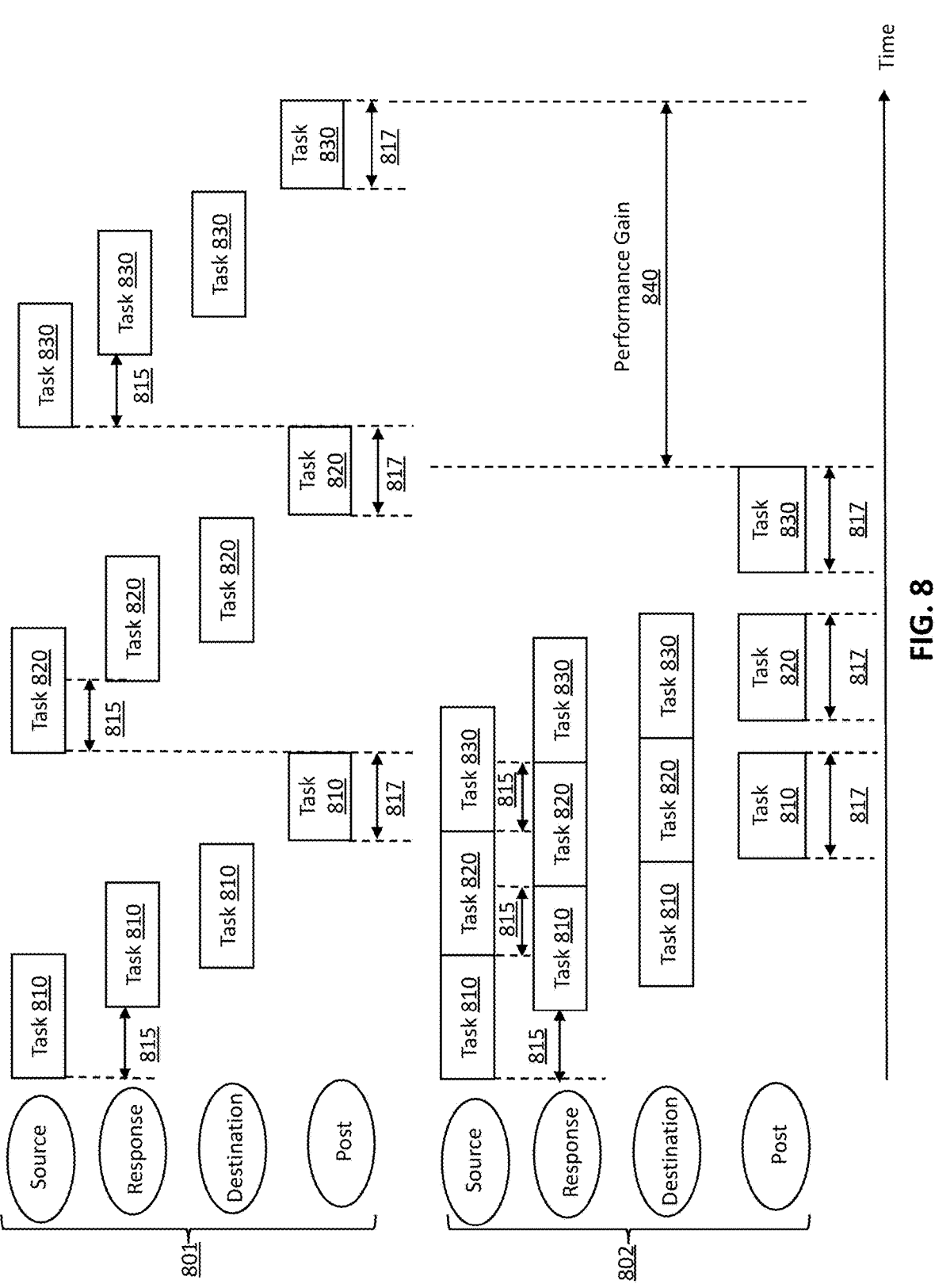
FIG. 8 illustrates a performance gain from processing multiple data transfer tasks in parallel, in accordance with various embodiments.

FIG. 8 illustrates a performance gain 840 from processing multiple data transfer tasks 810, 820, and 830 in parallel, in accordance with various embodiments. FIG. 8 shows two different cases. In the first case, a data transfer channel 801, which is unable to process multiple tasks in parallel, processes the data transfer tasks 810, 820, and 830 (also referred to as tasks 810, 820, and 830) in sequence. As shown in FIG. 8, the source stage of the task 820 does not start until the post stage of the task 810 is finished. Also, the source stage of the task 830 does not start until the post stage of the task 820 is finished. For each task, there is a read latency 815 and a write latency 817 The read latency 815 is a latency of reading data from the memory 210. The write latency 817 is a latency of writing data into the memory 210. The execution time of each task by the data transfer channel 801 includes both the read latency 815 and the write latency 817. As the data transfer tasks 810, 820, and 830 are processed sequentially, the total execution time of the data transfer channel 801 includes three times of the read latency 815 and three times of the write latency 817.

Different from the data transfer channel 801, the data transfer channel 802, in the second case, processes the data transfer tasks 810, 820, and 830 in parallel. An example of the data transfer channel 802 may be the data transfer channel 330 in FIG. 3. The data transfer channel 802 also suffers from the read latency 815 and the write latency 817. However, as the data transfer channel 802 can process the source stage of the task 820 once the source stage of the task 810 is finished, the data transfer channel 802 can issue read requests for the task 820 ahead of time and allows for the read latency 815 to be reduced (or even removed) from the execution of the task 820. Similarly, the data transfer channel 802 can issue read requests for the task 830 ahead of time and allows for the read latency 815 to be reduced (or even removed) from the execution of the task 830.

Additionally, the write latency 817 can be reduced from the executions of the tasks 810, 820, and 830 by the data transfer channel 802. As shown in FIG. 8, once the destination stage of the task 810 is finished, the destination stage of the task 820 is processed. This can reduce or even remove impact of the write latency 817 on the execution time of the task 810. Similarly, once the destination stage of the task 820 is finished, the destination stage of the task 820 is processed, and the impact of the write latency 817 on the execution time of the task 820 is reduced or even removed. Accordingly, the parallel execution of the tasks 810, 820, and 830 by the data transfer channel 802 significantly reduces the impact of the read latency 815 and write latency 817 on the total time of executing the tasks 810, 820, and 820. As shown in FIG. 8, the total execution time of the data transfer channel 802 is significantly shorter than the total execution time of the data transfer channel 801. The difference in the total execution time is shown as the performance gain 840.

Example Method of Deep Learning

FIG. 9 is a flowchart showing a method 900 of deep learning, in accordance with various embodiments. The method 900 may be performed by the DMA engine 220 in FIG. 2. Although the method 900 is described with reference to the flowchart illustrated in FIG. 9, many other methods for deep learning may alternatively be used. For example, the order of execution of the steps in FIG. 9 may be changed. As another example, some of the steps may be changed, eliminated, or combined.

The DMA engine 220 receives 910 a first data transfer task for transferring a first data block from a first memory to a second memory. The first data transfer task comprises a sequence of stages. The sequence of stages may include a source stage, a response stage, a destination stage, and a post stage. In some embodiments, the DMA engine 220 decomposes the first data transfer task into the sequence of stages.

The DMA engine 220 receives 920 a second data transfer task for transferring a second data block from the first memory to the second memory. The second data transfer task comprising the sequence of stages. In some embodiments, the DMA engine 220 decomposes the second data transfer task into the sequence of stages. The DMA engine 220 may receive the first data transfer task and the second data transfer task at different times.

The DMA engine 220 executes 930 different ones of the stages in the first data transfer task by a sequence of data processing modules in accordance with control signals from a sequence of control modules. In some embodiments, the sequence of data processing modules comprises a first data processing module, a second data processing module, a third data processing module, and a fourth data processing module. The first data processing module is configured to send, to the first memory, a request to read the first data block or the second data block stored in the first memory. The second data processing module is configured to receive a response from the first memory and to receive the first data block or the second data block from the first memory. The third data processing module is configured to send, to the second memory, a request to write the first data block or the second data block into the second memory. The fourth data processing module is configured to confirm whether the first data transfer task or the second data transfer task is completed.

In some embodiments, the sequence of control modules comprises a first control module, a second control module, a third control module, and a fourth control module. The first control module is configured to provide one or more first control signals to the first data processing module. The second control module is configured to provide one or more second control signals to the second data processing module. The third control module is configured to provide one or more third control signals to the third data processing module. The fourth control module is configured to provide one or more fourth control signals to the fourth data processing module.

The DMA engine 220 executes 940 different ones of the stages in the second data transfer task by the sequence of data processing modules in accordance with additional control signals from the sequence of control modules. In some embodiments, the DMA engine 220 stores the first data block or the second data block in a buffer in one of the data processing modules after the first data block is read from the first memory.

The DMA engine 220 may maintain a queue in which the first data transfer task is placed before the second data transfer task. The DMA engine 220 may execute a stage of the first data transfer task before executing the stage of the second data transfer task. The first data transfer task and the second data transfer task may be executed in parallel. In some embodiments, a second stage of the first data transfer task and a first stage of the second data transfer task are executed in parallel. The second stage is subsequent to the first stage in the sequence of stages. The first data transfer task may be received before the second data transfer task.

In some embodiments, the first data block or the second data block includes a weight in a kernel of a convolution or an activation in a tensor of the convolution. The convolution is performed by an array of processing elements that is associated with the DMA engine. The first memory is external to the array of processing elements. The second memory is internal to the array of processing elements.

Example PE Array

Figure 10:
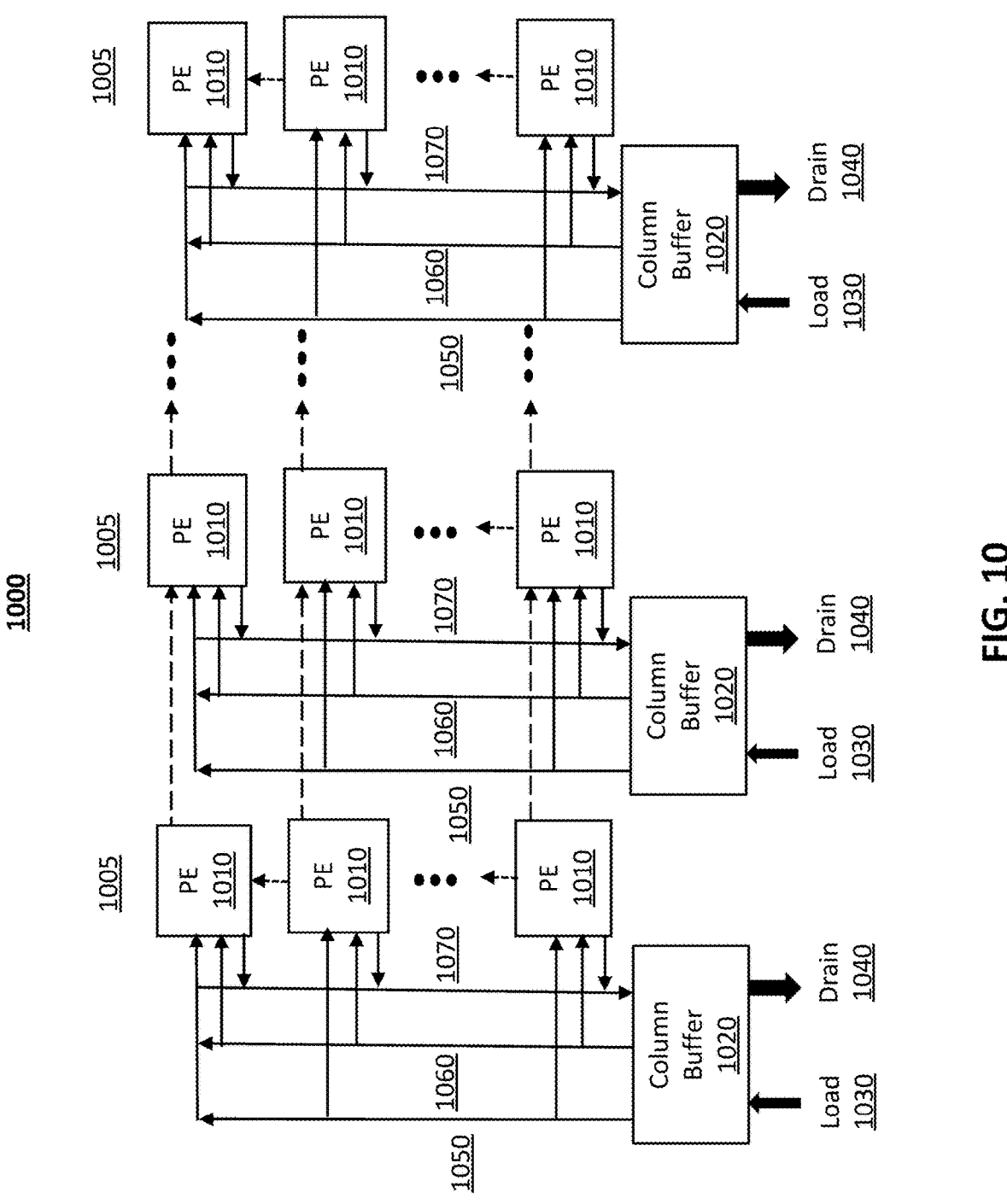
FIG. 10 illustrates a processing element (PE) array, in accordance with various embodiments.

FIG. 10 illustrates a PE array 1000, in accordance with various embodiments. The PE array 1000 is an embodiment of the PE array 230 in FIG. 2. The PE array 1000 includes a plurality of PEs 1010 (individually referred to as "PE 1010"). The PEs 1010 perform MAC operations, such as integer MAC operations, floating-point MAC operations, and so on. The PEs 1010 may also be referred to as neurons or nodes in the DNN. Each PE 1010 has 2 input signals 1050 and 1060 and an output signal 1070. The input signal 1050 is at least a portion of an input tensor of a convolution. The input signal 1060 is at least a portion of a weight tensor of the convolution. In some embodiments, the input signal 1050 of a PE 1010 includes one or more input operands, and the input signal 1060 includes one or more weight operands.

Each PE 1010 performs an MAC operation on the input signals 1050 and 1060 and outputs the output signal 1070, which is a result of the MAC operation. Some or all of the input signals 1050 and 1060 and the output signal 1070 may be in an integer format, such as INT8, or floating-point format, such as FP16 or BF16. For purpose of simplicity and illustration, the input signals and output signal of all the PEs 1010 have the same reference numbers, but the PEs 1010 may receive different input signals and output different output signals from each other. Also, a PE 1010 may be different from another PE 1010, e.g., including more, fewer, or different components.

As shown in FIG. 10, the PEs 1010 are connected to each other, as indicated by the dash arrows in FIG. 10. The output signal 1070 of an PE 1010 may be sent to many other PEs 1010 (and possibly back to itself) as input signals via the interconnections between PEs 1010. In some embodiments, the output signal 1070 of an PE 1010 may incorporate the output signals of one or more other PEs 1010 through an accumulate operation of the PE 1010 and generates an internal partial sum of the PE array. Certain aspects of the PEs 1010 are described below in conjunction with FIG. 11.

In the embodiments of FIG. 10, the PEs 1010 are arranged into columns 1005 (individually referred to as "column 1005" or "PE column 1005"). The input and weights of the layer may be distributed to the PEs 1010 based on the columns 1005. Each column 1005 has a column buffer 1020. The column buffer 1020 stores data provided to the PEs 1010 in the column 1005 for a short amount of time. The column buffer 1020 may also store data output by the last PE 1010 in the column 1005. The output of the last PE 1010 may be a sum of the MAC operations of all the PEs 1010 in the column 1005, which is a column-level internal partial sum of the PE array 1000. In other embodiments, input and weights may be distributed to the PEs 1010 based on rows in the PE array 1000. The PE array 1000 may include row buffers in lieu of column buffers 1020. A row buffer may store input signals of the PEs in the corresponding row and may also store a row-level internal partial sum of the PE array 1000.

As shown in FIG. 10, each column buffer 1020 is associated with a load 1030 and a drain 1040. The data provided to the column 1005 is transmitted to the column buffer 1020 through the load 1030, e.g., through upper memory hierarchies, e.g., the memory 210 in FIG. 2. The data generated by the column 1005 is extracted from the column buffers 1020 through the drain 1040. In some embodiments, data extracted from a column buffer 1020 is sent to upper memory hierarchies, e.g., the memory 210 in FIG. 2, through the drain operation. In some embodiments, the drain operation does not start until all the PEs 1010 in the column 1005 has finished their MAC operations. In some embodiments, the load 1030 or drain 1040 may be controlled by the DMA engine 220 in FIG. 2.

Figure 11:
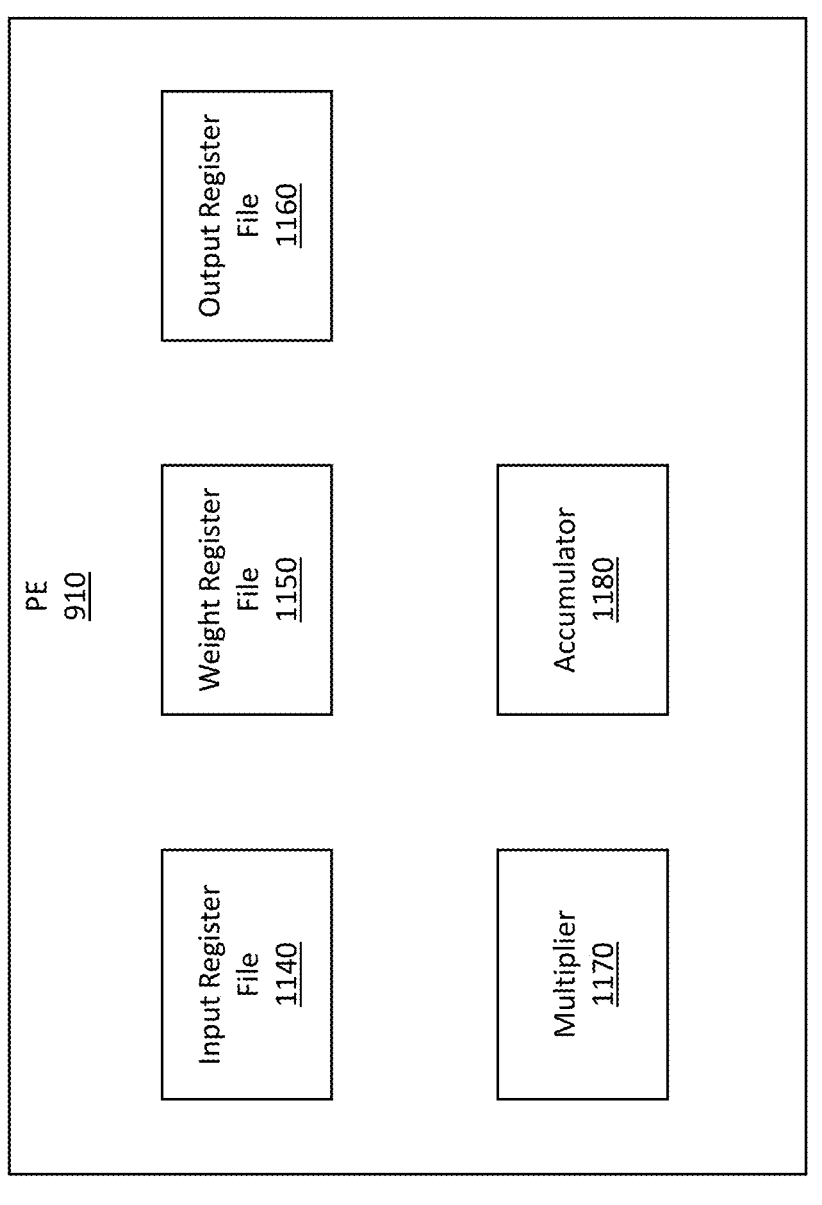
FIG. 11 is a block diagram of a PE, in accordance with various embodiments.

FIG. 11 is a block diagram of a PE 1010, in accordance with various embodiments. The PE 1010 in FIG. 10 includes an input register file 1140, a weight register file 1150, an output register file 1160, and a MAC unit 1170. In other embodiments, the PE 1010 may include fewer, more, or different components. For instance, the PE 1010 may include multiple MAC units 1170. In some embodiments, the input register file 1140, weight register file 1150, or output register file 1160 may be at least part of the memory 240.

The input register file 1140 temporarily stores input signals (e.g., contexts) received by the PE 1010. The input feature data may include input feature data and output signals from other PEs 1110. The weight register file 1150 temporarily stores weights received by the PE 1010. The output register file 1160 temporarily stores output signals generated by the PE 1010. For purpose of illustration and simplicity, the PE 1010 in FIG. 11B includes one input register file 1140, one weight register file 1150, one output register file 1160. In other embodiments, a PE 1010 may include multiple register files for each type of data. In some embodiments, the input register file 1140, weight register file 1150, and output register file 1160 are part of the memory 240.

The MAC unit 1170 performs MAC operations on data in the input register file 1140 and weight register file 1150. The MAC unit 1170 includes a multiply unit 1180 and an accumulate unit 1190. The multiply unit 1180 performs multiply operations on input feature data in the input register file 1140 and weights in the weight register file 1150. The amount of time needed by the multiply unit 1180 for a multiple operation depends on the sparsity level of the weights used in the multiple operation. If the weights are denser (i.e., the sparsity level is lower), the multiply unit 1180 needs more time to perform the multiple operation. The accumulate unit 1190 performs accumulate operations on the output of the multiply unit 1180 and outputs signals from other PEs. The output of the accumulate unit 1190 is the output signal of the PE 1010.

Example Deep Learning Environment

Figure 12:
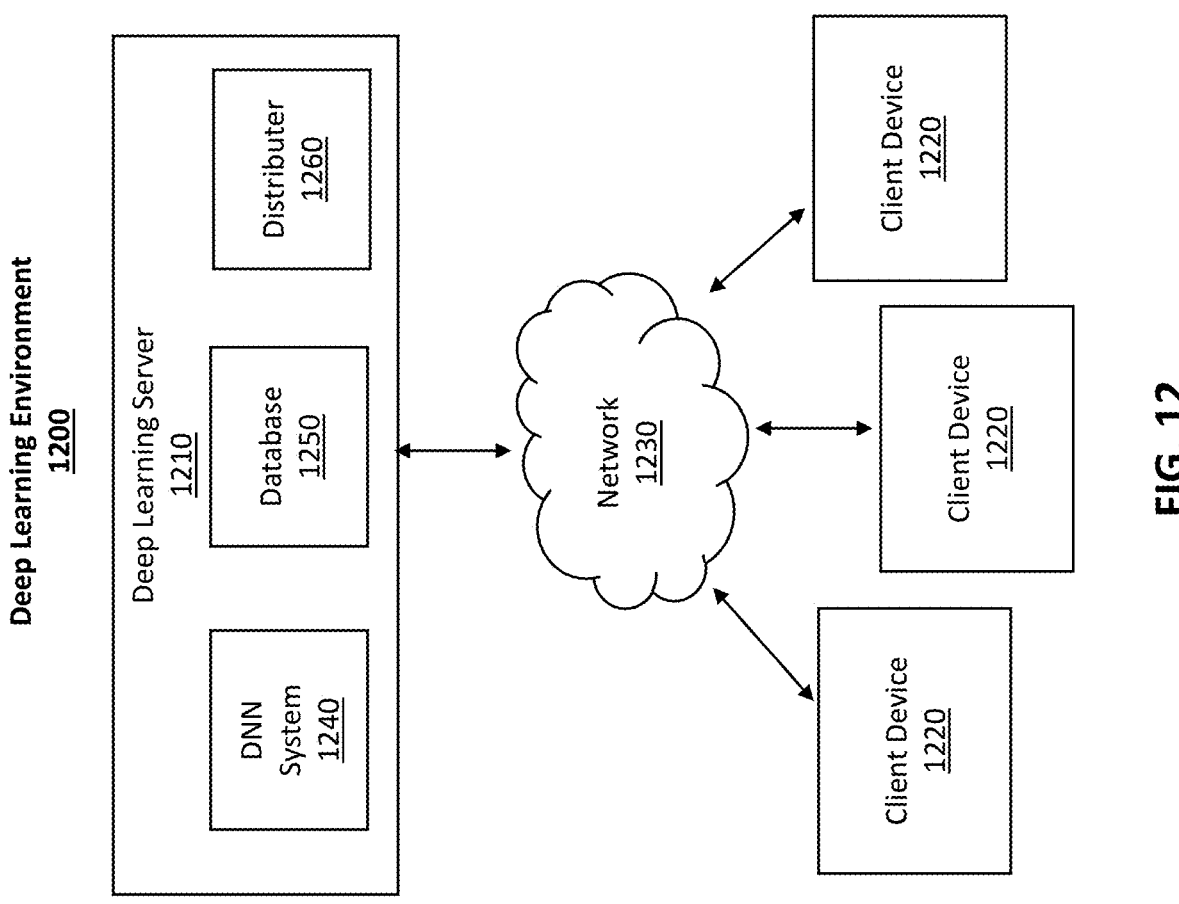
FIG. 12 illustrates a deep learning environment, in accordance with various embodiments.

FIG. 12 illustrates a deep learning environment 1200, in accordance with various embodiments. The deep learning environment 1200 includes a deep learning server 1210 and a plurality of client devices 1220 (individually referred to as client device 1220). The deep learning server 1210 is connected to the client devices 1220 through a network 1230. In other embodiments, the deep learning environment 1200 may include fewer, more, or different components.

The deep learning server 1210 trains deep learning models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The deep learning server 1210 can use various types of neural networks, such as DNN, recurrent neural network (RNN), generative adversarial network (GAN), long short-term memory network (LSTMN), and so on. During the process of training the deep learning models, the neural networks use unknown elements in the input distribution to extract features, group objects, and discover useful data patterns. The deep learning models can be used to solve various problems, e.g., making predictions, classifying images, and so on. The deep learning server 1210 may build deep learning models specific to particular types of problems that need to be solved. A deep learning model is trained to receive an input and outputs the solution to the particular problem.

In FIG. 12, the deep learning server 1210 includes a DNN system 1240, a database 1250, and a distributer 1260. The DNN system 1240 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. In some embodiments, the DNN system 1240 trains DNNs through knowledge distillation, e.g., dense-connection based knowledge distillation. The trained DNNs may be used on low memory systems, like mobile phones, IOT edge devices, and so on. An embodiment of the DNN system 1240 is the DNN accelerator 200 described above in conjunction with FIG. 2.

The database 1250 stores data received, used, generated, or otherwise associated with the deep learning server 1210. For example, the database 1250 stores a training dataset that the DNN system 1240 uses to train DNNs. In an embodiment, the training dataset is an image gallery that can be used to train a DNN for classifying images. The training dataset may include data received from the client devices 1220. As another example, the database 1250 stores hyperparameters of the neural networks built by the deep learning server 1210.

The distributer 1260 distributes deep learning models generated by the deep learning server 1210 to the client devices 1220. In some embodiments, the distributer 1260 receives a request for a DNN from a client device 1220 through the network 1230. The request may include a description of a problem that the client device 1220 needs to solve. The request may also include information of the client device 1220, such as information describing available computing resource on the client device. The information describing available computing resource on the client device 1220 can be information indicating network bandwidth, information indicating available memory size, information indicating processing power of the client device 1220, and so on. In an embodiment, the distributer may instruct the DNN system 1240 to generate a DNN in accordance with the request. The DNN system 1240 may generate a DNN based on the information in the request. For instance, the DNN system 1240 can determine the structure of the DNN and/or train the DNN in accordance with the request.

In another embodiment, the distributer 1260 may select the DNN from a group of pre-existing DNNs based on the request. The distributer 1260 may select a DNN for a particular client device 1220 based on the size of the DNN and available resources of the client device 1220. In embodiments where the distributer 1260 determines that the client device 1220 has limited memory or processing power, the distributer 1260 may select a compressed DNN for the client device 1220, as opposed to an uncompressed DNN that has a larger size. The distributer 1260 then transmits the DNN generated or selected for the client device 1220 to the client device 1220.

In some embodiments, the distributer 1260 may receive feedback from the client device 1220. For example, the distributer 1260 receives new training data from the client device 1220 and may send the new training data to the DNN system 1240 for further training the DNN. As another example, the feedback includes an update of the available computer resource on the client device 1220. The distributer 1260 may send a different DNN to the client device 1220 based on the update. For instance, after receiving the feedback indicating that the computing resources of the client device 1220 have been reduced, the distributer 1260 sends a DNN of a smaller size to the client device 1220.

The client devices 1220 receive DNNs from the distributer 1260 and applies the DNNs to perform machine learning tasks, e.g., to solve problems or answer questions. In various embodiments, the client devices 1220 input images into the DNNs and uses the output of the DNNs for various applications, e.g., visual reconstruction, augmented reality, robot localization and navigation, medical diagnosis, weather prediction, and so on. A client device 1220 may be one or more computing devices capable of receiving user input as well as transmitting and/or receiving data via the network 1230. In one embodiment, a client device 1220 is a conventional computer system, such as a desktop or a laptop computer. Alternatively, a client device 1220 may be a device having computer functionality, such as a personal digital assistant (PDA), a mobile telephone, a smartphone, an autonomous vehicle, or another suitable device. A client device 1220 is configured to communicate via the network 1230. In one embodiment, a client device 1220 executes an application allowing a user of the client device 1220 to interact with the deep learning server 1210 (e.g., the distributer 1260 of the deep learning server 1210). The client device 1220 may request DNNs or send feedback to the distributer 1260 through the application. For example, a client device 1220 executes a browser application to enable interaction between the client device 1220 and the deep learning server 1210 via the network 1230. In another embodiment, a client device 1220 interacts with the deep learning server 1210 through an application programming interface (API) running on a native operating system of the client device 1220, such as IOS® or ANDROID™.

In an embodiment, a client device 1220 is an integrated computing device that operates as a standalone network-enabled device. For example, the client device 1220 includes display, speakers, microphone, camera, and input device. In another embodiment, a client device 1220 is a computing device for coupling to an external media device such as a television or other external display and/or audio output system. In this embodiment, the client device 1220 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 1220 may be configured to be compatible with a generic external media device that does not have specialized software, firmware, or hardware specifically for interacting with the client device 1220.

The network 1230 supports communications between the deep learning server 1210 and client devices 1220. The network 1230 may comprise any combination of local area and/or wide area networks, using both wired and/or wireless communication systems. In one embodiment, the network 1230 may use standard communications technologies and/or protocols. For example, the network 1230 may include communication links using technologies such as Ethernet, 12010.11, worldwide interoperability for microwave access (WiMAX), 3G, 4G, code division multiple access (CDMA), digital subscriber line (DSL), etc. Examples of networking protocols used for communicating via the network 1230 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1230 may be represented using any suitable format, such as hypertext markup language (HTML) or extensible markup language (XML). In some embodiments, all or some of the communication links of the network 1230 may be encrypted using any suitable technique or techniques.

Example DNN System

Figure 13:
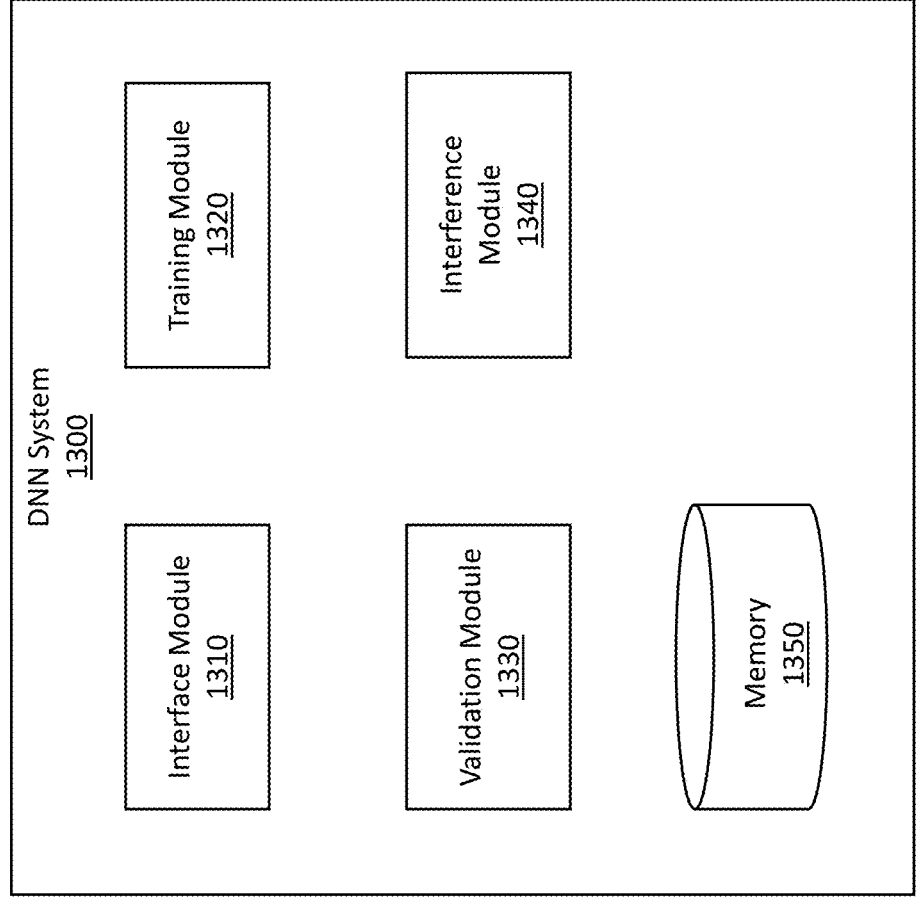
FIG. 13 is a block diagram of an example DNN system, in accordance with various embodiments.

FIG. 13 is a block diagram of an example DNN system 1300, in accordance with various embodiments. The whole DNN system 1300 or a part of the DNN system 1300 may be implemented in the computing device 1400 in FIG. 14. The DNN system 1300 trains DNNs for various tasks, such as image classification, learning relationships between biological cells (e.g., DNA, proteins, etc.), control behaviors for devices (e.g., robots, machines, etc.), and so on. The DNN system 1300 includes an interface module 1310, a training module 1320, a validation module 1330, an inference module 1340, and a memory 1350. In other embodiments, alternative configurations, different or additional components may be included in the DNN system 1300. Further, functionality attributed to a component of the DNN system 1300 may be accomplished by a different component included in the DNN system 1300 or a different system. The DNN system 1300 or a component of the DNN system 1300 (e.g., the training module 1320 or inference module 1340) may include the computing device 1400.

The interface module 1310 facilitates communications of the DNN system 1300 with other systems. For example, the interface module 1310 establishes communications between the DNN system 1300 with an external database to receive data that can be used to train DNNs or input into DNNs to perform tasks. As another example, the interface module 1310 supports the DNN system 1300 to distribute DNNs to other systems, e.g., computing devices configured to apply DNNs to perform tasks.

The training module 1320 trains DNNs by using a training dataset. The training module 1320 forms the training dataset. In an embodiment where the training module 1320 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1330 to validate performance of a trained DNN. The portion of the training dataset not including the tuning subset and the validation subset may be used to train the DNN.

The training module 1320 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 13, 130, 500, 1300, or even larger.

The training module 1320 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1320 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1320 defines the architecture of the DNN, the training module 1320 inputs a training dataset into the DNN. The training dataset includes a plurality of training samples. An example of a training sample includes an object in an image and a ground-truth label of the object. The training module 1320 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1320 uses a cost function to minimize the error.

The training module 1320 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 1320 finishes the predetermined number of epochs, the training module 1320 may stop updating the parameters in the DNN. The DNN having the updated parameters is referred to as a trained DNN.

The validation module 1330 verifies accuracy of trained DNNs. In some embodiments, the validation module 1330 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1330 determines may determine an accuracy score measuring the precision, recall, or a combination of precision and recall of the DNN. The validation module 1330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1330 may compare the accuracy score with a threshold score. In an example where the validation module 1330 determines that the accuracy score of the augmented model is lower than the threshold score, the validation module 1330 instructs the training module 1320 to re-train the DNN. In one embodiment, the training module 1320 may iteratively re-train the DNN until the occurrence of a stopping condition, such as the accuracy measurement indication that the DNN may be sufficiently accurate, or a number of training rounds having taken place.

The inference module 1340 applies the trained or validated DNN to perform tasks. For instance, the inference module 1340 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1340 distributes the DNN to other systems, e.g., computing devices in communication with the DNN system 1300, for the other systems to apply the DNN to perform the tasks.

The memory 1350 stores data received, generated, used, or otherwise associated with the DNN system 1300. For example, the memory 1350 stores the datasets used by the training module 1320 and validation module 1330. The memory 1350 may also store data generated by the training module 1320 and validation module 1330, such as the hyperparameters for training DNNs, internal parameters of trained DNNs (e.g., values of tunable parameters of FALUs), etc. In the embodiment of FIG. 13, the memory 1350 is a component of the DNN system 1300. In other embodiments, the memory 1350 may be external to the DNN system 1300 and communicate with the DNN system 1300 through a network.

Example Computing Device

Figure 14:
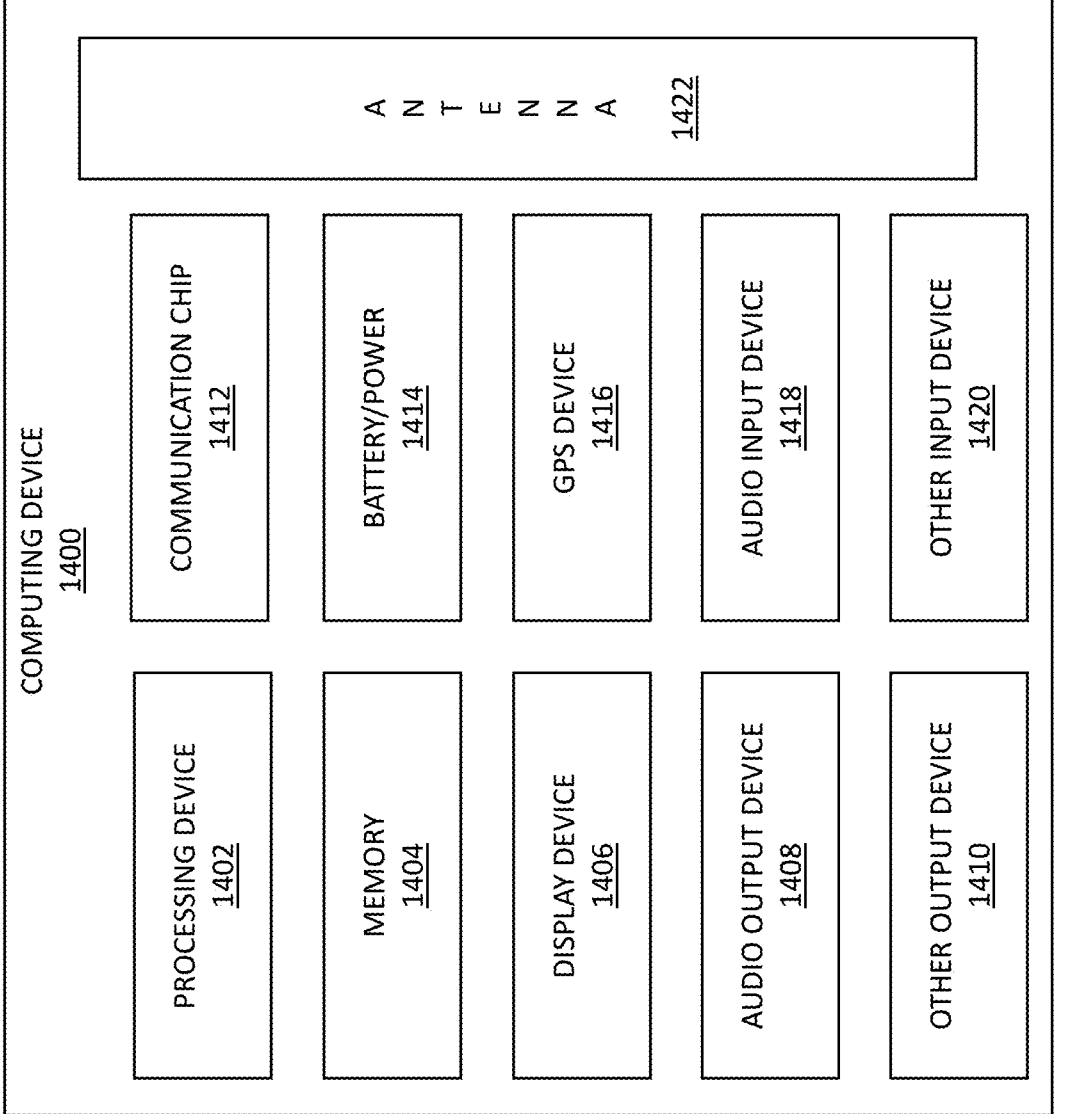
FIG. 14 is a block diagram of an example computing device, in accordance with various embodiments.

FIG. 14 is a block diagram of an example computing device 1400, in accordance with various embodiments. In some embodiments, the computing device 1400 can be used as the DNN system 1300 in FIG. 13. A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system on a chip (SoC) die. Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1418 or an audio output device 1408, but may include audio input or output device interface circuitry (e.g., connectors and supporting circuitry) to which an audio input device 1418 or audio output device 1408 may be coupled.

The computing device 1400 may include a processing device 1402 (e.g., one or more processing devices). The processing device 1402 processes electronic data from registers and/or memory to transform that electronic data into other electronic data that may be stored in registers and/or memory. The computing device 1400 may include a memory 1404, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1404 may include memory that shares a die with the processing device 1402. In some embodiments, the memory 1404 includes one or more non-transitory computer-readable media storing instructions executable to perform operations for deep learning, e.g., the method 1100 described above in conjunction with FIG. 8 or some operations performed by the DNN accelerator described above in conjunction with FIG. 2 (e.g., operations performed by the DMA engine 220). The instructions stored in the one or more non-transitory computer-readable media may be executed by the processing device 2402.

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1418 (or corresponding interface circuitry, as discussed above). The audio input device 1418 may include any device that generates a signal representative of a sound, such as microphones, microphone arrays, or digital instruments (e.g., instruments having a musical instrument digital interface (MIDI) output).

The computing device 1400 may include a GPS device 1416 (or corresponding interface circuitry, as discussed above). The GPS device 1416 may be in communication with a satellite-based system and may receive a location of the computing device 1400, as known in the art.

The computing device 1400 may include an other output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include an other input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (register fileID) reader.

The computing device 1400 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1400 may be any other electronic device that processes data.

SELECT EXAMPLES

The following paragraphs provide various examples of the embodiments disclosed herein.

Example 1 provides a DMA engine, including a datapath configured to execute a plurality of data transfer tasks, where a data transfer task is a task for transferring a data block from a first memory to a second memory and includes a sequence of stages, and the datapath includes a sequence of data processing modules for executing the sequence of stages; and a controller configured to provide control signals to the datapath for controlling an execution of each data transfer task by the datapath, where the controller includes a sequence of control modules, each of which is configured to control a different one of the data processing modules.

Example 2 provides the DMA engine of example 1, where the sequence of data processing modules includes a first data processing module configured to send, to the first memory, a request to read the data block stored in the first memory; a second data processing module configured to receive a response from the first memory and to receive the data block from the first memory; a third data processing module configured to send, to the second memory, a request to write the data block into the second memory; and a fourth data processing module configured to confirm whether the data transfer task is completed.

Example 3 provides the DMA engine of example 2, where the sequence of control modules includes a first control module configured to provide one or more first control signals to the first data processing module; a second control module configured to provide one or more second control signals to the second data processing module; a third control module configured to provide one or more third control signals to the third data processing module; and a fourth control module configured to provide one or more fourth control signals to the fourth data processing module.

Example 4 provides the DMA engine of any of the preceding examples, where a data processing module in the datapath includes a buffer in which the data block is stored after the data block is read from the first memory.

Example 5 provides the DMA engine of any of the preceding examples, where a control module in the controller is configured to maintain a queue in which the plurality of data transfer tasks is arranged in an order, and a data processing module in the datapath is configured to executes the plurality of data transfer tasks in the order.

Example 6 provides the DMA engine of any of the preceding examples, where the datapath is configured to execute the plurality of data transfer tasks in parallel.

Example 7 provides the DMA engine of example 6, where the plurality of data transfer tasks includes a first data transfer task and a second data transfer task, the plurality of stages includes a first stage and a second stage, and a second stage of the first data transfer task and a first stage of the second data transfer task are processed are processed in parallel.

Example 8 provides the DMA engine of example 7, where the DMA engine receives the first data transfer task before the second data transfer task.

Example 9 provides the DMA engine of any of the preceding examples, where the DMA engine further includes a memory interface configured to facilitate communication between the datapath and the first memory or to facilitate communication between the datapath and the second memory.

Example 10 provides the DMA engine of any of the preceding examples, where the data block includes a weight in a kernel of a convolution or an activation in a tensor of the convolution, the convolution is performed by an array of processing elements that is associated with the DMA engine, the first memory is external to the array of processing elements, and the second memory is internal to the array of processing elements.

Example 11 provides a method for deep learning, including receiving a first data transfer task for transferring a first data block from a first memory to a second memory, the first data transfer task including a sequence of stages; receiving a second data transfer task for transferring a second data block from the first memory to the second memory, the second data transfer task including the sequence of stages; executing different ones of the stages in the first data transfer task by a sequence of data processing modules in accordance with control signals from a sequence of control modules; and executing different ones of the stages in the second data transfer task by the sequence of data processing modules in accordance with additional control signals from the sequence of control modules.

Example 12 provides the method of example 11, where the sequence of data processing modules includes a first data processing module configured to send, to the first memory, a request to read the first data block or the second data block stored in the first memory; a second data processing module configured to receive a response from the first memory and to receive the first data block or the second data block from the first memory; a third data processing module configured to send, to the second memory, a request to write the first data block or the second data block into the second memory; and a fourth data processing module configured to confirm whether the first data transfer task or the second data transfer task is completed.

Example 13 provides the method of example 12, where the sequence of control modules includes a first control module configured to provide one or more first control signals to the first data processing module; a second control module configured to provide one or more second control signals to the second data processing module; a third control module configured to provide one or more third control signals to the third data processing module; and a fourth control module configured to provide one or more fourth control signals to the fourth data processing module.

Example 14 provides the method of any one of examples 11-13, further including storing the first data block in a buffer in one of the data processing modules after the first data block is read from the first memory.

Example 15 provides the method of any one of examples 11-14, further including maintaining a queue in which the first data transfer task is placed before the second data transfer task; and executing a stage of the first data transfer task before executing the stage of the second data transfer task.

Example 16 provides the method of any one of examples 11-15, where a second stage of the first data transfer task and a first stage of the second data transfer task are executed in parallel, and the second stage is subsequent to the first stage in the sequence of stages.

Example 17 provides the method of example 16, where the first data transfer task is received before the second data transfer task.

Example 18 provides the method of any one of examples 11-17, where the first data transfer task and the second data transfer task are executed in parallel.

Example 19 provides the method of any one of examples 11-18, where the first data block or the second data block includes a weight in a kernel of a convolution or an activation in a tensor of the convolution, and the convolution is performed by an array of processing elements.

Example 20 provides the method of example 19, where the first memory is external to the array of processing elements, and the second memory is internal to the array of processing elements.

Example 21 provides one or more non-transitory computer-readable media storing instructions executable to perform operations for training a target neural network, the operations including receiving a first data transfer task for transferring a first data block from a first memory to a second memory, the first data transfer task including a sequence of stages; receiving a second data transfer task for transferring a second data block from the first memory to the second memory, the second data transfer task including the sequence of stages; executing different ones of the stages in the first data transfer task by a sequence of data processing modules in accordance with control signals from a sequence of control modules; and executing different ones of the stages in the second data transfer task by the sequence of data processing modules in accordance with additional control signals from the sequence of control modules.

Example 22 provides the one or more non-transitory computer-readable media of example 21, where the sequence of data processing modules includes a first data processing module configured to send, to the first memory, a request to read the first data block or the second data block stored in the first memory; a second data processing module configured to receive a response from the first memory and to receive the first data block or the second data block from the first memory; a third data processing module configured to send, to the second memory, a request to write the first data block or the second data block into the second memory; and a fourth data processing module configured to confirm whether the first data transfer task or the second data transfer task is completed.

Example 23 provides the one or more non-transitory computer-readable media of example 21 or 22, where operations further include storing the first data block in a buffer in one of the data processing modules after the first data block is read from the first memory.

Example 24 provides the one or more non-transitory computer-readable media of any one of examples 21-23, where the operations further include maintaining a queue in which the first data transfer task is placed before the second data transfer task; and executing a stage of the first data transfer task before executing the stage of the second data transfer task.

Example 25 provides the one or more non-transitory computer-readable media of any one of examples 21-24, where a second stage of the first data transfer task and a first stage of the second data transfer task are executed in parallel, and the second stage is subsequent to the first stage in the sequence of stages.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A direct memory access (DMA) engine, comprising:
a datapath configured to execute a plurality of data transfer tasks, wherein a data transfer task is a task for transferring a data block from a first memory to a second memory and comprises a sequence of stages, wherein the datapath comprises a sequence of data processing modules for executing the sequence of stages, wherein the sequence of data processing modules comprises:
a first data processing module configured to send, to the first memory, a request to read the data block stored in the first memory,
a second data processing module configured to receive a response from the first memory and to receive the data block from the first memory,
a third data processing module configured to send, to the second memory, a request to write the data block into the second memory, and
a fourth data processing module configured to confirm whether the data transfer task is completed; and
a controller configured to provide control signals to the datapath for controlling an execution of each data transfer task by the datapath, wherein the controller comprises a sequence of control modules, each of which is configured to control a different one of the data processing modules.

2. The DMA engine of claim 1, wherein the sequence of control modules comprises:
a first control module configured to provide one or more first control signals to the first data processing module;
a second control module configured to provide one or more second control signals to the second data processing module;
a third control module configured to provide one or more third control signals to the third data processing module; and
a fourth control module configured to provide one or more fourth control signals to the fourth data processing module.

3. The DMA engine of claim 1, wherein the second data processing module comprises a buffer in which the data block is stored after the data block is read from the first memory.

4. The DMA engine of claim 1, wherein a control module in the controller is configured to maintain a queue in which the plurality of data transfer tasks is arranged in an order, and a data processing module in the datapath is configured to execute the plurality of data transfer tasks in the order.

5. The DMA engine of claim 1, wherein the datapath is configured to execute the plurality of data transfer tasks in parallel.

6. The DMA engine of claim 5, wherein:
the plurality of data transfer tasks comprises a first data transfer task and a second data transfer task,
the plurality of stages includes a first stage and a second stage, and
a second stage of the first data transfer task and a first stage of the second data transfer task are processed in parallel.

7. The DMA engine of claim 6, wherein the DMA engine receives the first data transfer task before the second data transfer task.

8. The DMA engine of claim 1, wherein the DMA engine further comprises a memory interface configured to facilitate communication between the datapath and the first memory or to facilitate communication between the datapath and the second memory.

9. The DMA engine of claim 1, wherein:

the data block includes a weight in a kernel of a convolution or an activation in a tensor of the convolution, the convolution is performed by an array of processing elements that is associated with the DMA engine, the first memory is external to the array of processing elements, and the second memory is internal to the array of processing elements.

10. A method for deep learning, comprising:

receiving a first data transfer task for transferring a first data block from a first memory to a second memory, the first data transfer task comprising a sequence of stages;

receiving a second data transfer task for transferring a second data block from the first memory to the second memory, the second data transfer task comprising the sequence of stages;

executing different ones of the stages in the first data transfer task by a sequence of data processing modules in accordance with control signals from a sequence of control modules; and executing different ones of the stages in the second data transfer task by the sequence of data processing modules in accordance with additional control signals from the sequence of control modules, wherein the sequence of data processing modules comprises:

a first data processing module configured to send, to the first memory, a request to read the first data block or the second data block stored in the first memory, a second data processing module configured to receive a response from the first memory and to receive the first data block or the second data block from the first memory, a third data processing module configured to send, to the second memory, a request to write the first data block or the second data block into the second memory, and a fourth data processing module configured to confirm whether the first data transfer task or the second data transfer task is completed.

11. The method of claim 10, wherein the sequence of control modules comprises:

a first control module configured to provide one or more first control signals to the first data processing module;

a second control module configured to provide one or more second control signals to the second data processing module;

a third control module configured to provide one or more third control signals to the third data processing module; and a fourth control module configured to provide one or more fourth control signals to the fourth data processing module.

12. The method of claim 10, further comprising:

storing the first data block in a buffer in the second data processing module after the first data block is read from the first memory.

13. The method of claim 10, further comprising:

maintaining a queue in which the first data transfer task is placed before the second data transfer task; and executing a stage of the first data transfer task before executing the stage of the second data transfer task.

14. The method of claim 10, wherein a second stage of the first data transfer task and a first stage of the second data transfer task are executed in parallel, and the second stage is subsequent to the first stage in the sequence of stages.

15. The method of claim 14, wherein the first data transfer task is received before the second data transfer task.

16. The method of claim 10, wherein the first data transfer task and the second data transfer task are executed in parallel.

17. The method of claim 10, wherein the first data block or the second data block includes a weight in a kernel of a convolution or an activation in a tensor of the convolution, and the convolution is performed by an array of processing elements.

18. The method of claim 17, wherein the first memory is external to the array of processing elements, and the second memory is internal to the array of processing elements.

19. One or more non-transitory computer-readable media storing instructions executable to perform operations for deep learning, the operations comprising:

receiving a first data transfer task for transferring a first data block from a first memory to a second memory, the first data transfer task comprising a sequence of stages;

receiving a second data transfer task for transferring a second data block from the first memory to the second memory, the second data transfer task comprising the sequence of stages;

executing different ones of the stages in the first data transfer task by a sequence of data processing modules in accordance with control signals from a sequence of control modules; and executing different ones of the stages in the second data transfer task by the sequence of data processing modules in accordance with additional control signals from the sequence of control modules, wherein the sequence of data processing modules comprises:

a first data processing module configured to send, to the first memory, a request to read the first data block or the second data block stored in the first memory, a second data processing module configured to receive a response from the first memory and to receive the first data block or the second data block from the first memory, a third data processing module configured to send, to the second memory, a request to write the first data block or the second data block into the second memory, and a fourth data processing module configured to confirm whether the first data transfer task or the second data transfer task is completed.

20. The one or more non-transitory computer-readable media of claim 19, wherein the operations further comprise:

storing the first data block in a buffer in the second data processing module after the first data block is read from the first memory.

21. The one or more non-transitory computer-readable media of claim 19, wherein the operations further comprise:

maintaining a queue in which the first data transfer task is placed before the second data transfer task; and executing a stage of the first data transfer task before executing the stage of the second data transfer task.

22. The one or more non-transitory computer-readable media of claim 19, wherein a second stage of the first data transfer task and a first stage of the second data transfer task are executed in parallel, and the second stage is subsequent to the first stage in the sequence of stages.

* * * * *